(12) United States Patent
Reynolds et al.

(10) Patent No.: US 8,284,473 B2
(45) Date of Patent: Oct. 9, 2012

(54) DUAL ACTIVE FILM ELECTROCHROMIC DISPLAY DEVICE

(75) Inventors: John R. Reynolds, Gainesville, FL (US); Aubrey Lynn Dyer, Gainesville, FL (US); Ece Unur, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 121 days.

(21) Appl. No.: 12/746,541

(22) PCT Filed: Mar. 24, 2009

(86) PCT No.: PCT/US2009/038028
§ 371 (c)(1),
(2), (4) Date: Jun. 7, 2010

(87) PCT Pub. No.: WO2009/120658
PCT Pub. Date: Oct. 1, 2009

(65) Prior Publication Data
US 2010/0265562 A1    Oct. 21, 2010

Related U.S. Application Data

(60) Provisional application No. 61/038,936, filed on Mar. 24, 2008.

(51) Int. Cl.
*G02F 1/153* (2006.01)
(52) U.S. Cl. ......................... 359/273; 359/275
(58) Field of Classification Search ............... 359/273, 359/275
See application file for complete search history.

(56) References Cited

U.S. PATENT DOCUMENTS

| 4,135,790 A | 1/1979 | Takahashi et al. |
| 4,218,120 A | 8/1980 | Kawamura et al. |
| 2003/0189749 A1 | 10/2003 | Morrison et al. |
| 2006/0066933 A1* | 3/2006 | Jagt et al. .................. 359/265 |
| 2008/0278792 A1* | 11/2008 | Jang et al. .................. 359/266 |

FOREIGN PATENT DOCUMENTS

| JP | 1993-100253 | 4/1993 |
| WO | WO 2006-045043 | 4/2006 |

OTHER PUBLICATIONS

Unur, E. et al., "Dual-Polymer Electrochromic Film Characterization Using Bipotentiostatic Control," *Chemistry of Materials*, 2008, p. 2328, vol. 20, No. 6.

* cited by examiner

*Primary Examiner* — James Jones
(74) *Attorney, Agent, or Firm* — Saliwanchik, Lloyd & Eisenschenk

(57) ABSTRACT

A dual active electrochromic device is a combination of at least two working electrodes that contain electrochromic materials and at least one counter electrode where the potentials between each working electrode and a counter electrode are independently supplied. No more than one electrode is reflective. The color of the device results from the additive color of the electrochromic materials and varies according to the potentials applied independently. The electrochromic materials can be electrochromic polymers that are deposited as film on substrates to form the working electrodes. The electrochromic device can be used for display or window applications.

50 Claims, 21 Drawing Sheets

DUAL ACTIVE FILM ELECTROCHROMIC DISPLAY DEVICE

CROSS-REFERENCE TO RELATED APPLICATIONS

This application is the U.S. national stage application of International Patent Application No. PCT/US2009/038028, filed Mar.24, 2009, which claims the benefit of U.S. Provisional Application Ser. No. 61/038,936, filed Mar.24, 2008, the disclosures of which are hereby incorporated by reference in their entireties, including any figures, tables, or drawings.

BACKGROUND OF THE INVENTION

Electrochromism is a color change in a material caused by an electrochemical oxidation or reduction reaction. Some electrochromic materials can be repeatedly switched between a colored and a non-colored state, while others exhibit multiple colored states. Conjugated electroactive polymers are one class of electrochromic materials where available colors can span the entire visible region of the electromagnetic spectrum. Further, the polymers have electrochromic activity outside of the visible in the UV, the near infrared, longer infrared and microwave regions of the spectrum. Electrochromism in conjugated electroactive polymers arises from the electronic transitions in the neutral polymer and electronic transitions created during oxidation or reduction. The color of the neutral state of the polymer is determined by the energy difference between the highest occupied molecular orbitals (HOMOs) that constitute the valence band and the lowest unoccupied molecular orbitals (LUMOs) that make up the conduction band, where the energy difference for the transition between the HOMO and LUMO levels is the bandgap. For many conjugated electroactive polymers, the bandgap lies in the visible region, yielding a highly colored polymer in the neutral state. Upon oxidation (p-doping) lower energy electronic transitions are created by the removal of electrons from the HOMO. The electronic transitions on p-doping occur at longer wavelengths that often extend into the infrared and lower energies. Such polymers having a neutral colored state and highly transmissive (to visible light) oxidized state are cathodically coloring polymers. On the other hand, there is a class of electrochromic polymers that have bandgap energies that occur in the ultraviolet (UV) spectrum. These polymers are essentially colorless in the neutral state and become colored upon oxidation where the lower energy midgap states allow for electronic transition to occur in the visible region of the spectrum. These polymers are referred to as anodically coloring polymers.

Two common electrochromic display devices (electrochromic devices) that use conjugated electroactive polymers are referred to as absorptive/transmissive and absorptive/reflective display devices. Absorptive/transmissive display devices contain two electrodes, a working and a counter electrode, which are transmissive to the wavelengths of interest, typically visible light. To maintain charge balance during switching and effective control of the color contrast exhibited by the device, electroactive polymers are coated at each electrode. For a device that switches between a colored and a non-colored state, as needed for electrochromic windows, a cathodically coloring polymer is coated at one electrode, while an anodically coloring polymer is coated at the other with an electrolyte layer positioned between the electrodes. While switching the bias of the device, the polymers act in a complementary nature with both switching between their respective colored and non-colored states where the resulting colors are a summation of those exhibited by the individual polymers. Because anodically and cathodically coloring polymers are used, the optical contrast can be high, but the variety of available colors is rather limited as very few polymer pairs are known that, when summed together, produce colors that are visually pleasing or of much utility as needed for commercial display or window applications. Generally, less saturated and more pastel-like or "earth-tone" colors are available.

Absorptive/reflective devices also contain two electroactive polymers coated onto electrodes, a working electrode and a counter electrode. However, the electrode materials are generally arranged in a configuration where their relative placement allows only one active layer to be seen as an outward facing electrode. In one common device configuration, the active working electrode is a gold-coated porous membrane onto which an electrochromic polymer of interest is cast. The metal electrode is necessarily porous to allow counter ion diffusion provided by an electrolyte to occur evenly between the polymer films during switching. Behind the porous working electrode is the counter electrode onto which another electroactive polymer layer is coated. This second polymer layer does not lend any optical properties to the device, but acts as a charge balancing layer. When a cathodically coloring polymer is used as part of the working reflective electrode, the device is colored when biased with a negative voltage; the color being that of the neutral electrochromic polymer. When the voltage across the device is positive enough to oxidize the polymer, it becomes transmissive, exposing the reflective electrode underneath.

Although conjugated conducting polymers offer a large color palette, in addition to a transmissive state, the colors exhibited in an electrochromic device incorporating these polymers are generally limited to two states and no systematic control of the wide variety of color is presently possible. Given that the simultaneous switching of a cathodically and an anodically coloring polymer in an absorptive/transmissive electrochromic device occurs with an additive color combination, many of the presently exhibited colors are not particularly pleasing for a display device. Furthermore, present devices do not generally allow the switching between multiple colored states and a transmissive state. Such color control is even less available for a reflective device where the colors of only a single electroactive polymer are available. Hence, there remains a need for a transmissive or reflective device that can display a variety of colors, particularly where a color combination is available that can be designed for a desired application.

BRIEF SUMMARY OF THE INVENTION

Embodiments of the invention are directed to electrochromic devices, which can act as a single pixel of many pixels in a display, or can be a single device such as an electrochromic window. The device includes a first working electrode that has a first transmissive material and a first electrochromic material, a second working electrode that is a second material, which can be the same or different than the first transmissive material, and at least one second electrochromic material, a counter electrode that has an electroactive material that exhibits little to no optical transition in the wavelength region of interest, and at least one electrolyte containing material dispersed between and contacting counter electrodes to working electrodes. Electrical potentials can be independently applied between the first working electrode and one counter electrode and second working electrode and one counter electrode. The device displays a color depending upon the combination of colors seen through the two working electrodes, whose colors depend on the potentials that are independently applied. In this manner the device in a display can provide a wide variety of colors by simply controlling the working electrode potentials independently of one another.

In one embodiment of the invention one or more additional working electrodes and one or more counter electrodes can be included into the electrochromic device. With even three working electrodes it is possible to achieve a full color palette in a visible light electrochromic device by the combination of colors when applying specific potentials between the three working electrodes and the counter electrode to which they are coupled.

In one embodiment the counter electrode is transmissive, can be conductive on one or both sides, and is sandwiched between the working electrodes. This counter electrode can be porous or partitioned to allow a single electrolyte containing material to exist in the spaces within the counter electrode and on both sides of this electrode such that the needed electrical connectivities can be achieved using a single electrolyte containing material. The counter electrode can be a conductive material that is coated with an electroactive material that exhibits little to no optical changes in the wavelengths of interest and can be a non-color switching conducting polymer on at least a portion of both sides of the counter electrode.

In another embodiment of the invention the device has a second working electrode that is reflective or is transparent and has a surface opposite the counter electrode that contacts an adjacent or attached reflective material. In this embodiment the electrochromic material of the second working electrode is disposed on the surface directed toward the counter electrode, which is transmissive and is sandwiched between the working electrodes. The reflectance can be specular or diffuse.

In another embodiment the second working electrode is sandwiched between the first working electrode and the counter electrode, and the second working electrode is porous or partitioned such that an electrolyte containing material can exist in the spaces within the second working electrode and on both sides of this electrode such that the needed electrical connectivities can be achieved using a single electrolyte containing material. The second working electrode has an electrochromic material disposed on its surface and can be transparent or can have a reflective surface where the electrochromic material is directed toward the first working electrode. Again, the reflective surface can be specular or diffuse reflective.

Depending on the materials used for construction of the device, the device can require a means of containment, as when the electrolyte containing material is a fluid, or if any material of construction must be protected from its working environment. The device is connected to a means of independently providing a variable electrical potential between each of the working electrode and the counter electrode. Although the device has been described for two working electrodes, the device can include a third or even more working electrodes where a potential can be independently applied between a given working electrode and a counter electrode. A plurality of counter electrodes can be included in a device.

DETAILED DESCRIPTION OF THE INVENTION

Embodiments of the invention are directed to electrochromic display devices that may exhibit multiple colored states in addition to a transmissive state that can be controlled by potentials independently applied between working electrodes coated with different electroactive materials and one or more counter electrodes coated with electroactive materials, for example, redox active materials. The optical contrast of the device does not require the inclusion of both a cathodically coloring polymer and an anodically coloring polymer to which it is paired. Furthermore the novel display device provides visually pleasing additive color combinations. The inventive device employs a plurality of active working electrodes coated with electrochromic materials, generally electroactive conjugated polymers, using a common counter electrode. The working electrodes are independently controlled and switched to allow a multiplicity of color states with the device. The devices can be either absorptive/transmissive or absorptive/reflective-type display devices. Where the device is an absorptive/reflective-type display, the reflection can be mirror-like specular or paper-like diffuse. For the purposes of the invention the term color is not to be restricted to those of the visible spectrum and observable to the human eye, as the detector, but rather color can be any wavelength that any intended detector can observe. For many applications, a color state can be one not in the visible, but rather in the UV, near infrared, longer infrared or the microwave regions of the spectrum, where a transmissive state is simply that where there is no or significantly less absorption in the region where the color can be observed by the detector. Although desirable, the transmissive state need not be completely transparent; rather, the absorption should be significantly reduced such that the contrast from the colored state is significant and discernibly low in color.

Figure 1:
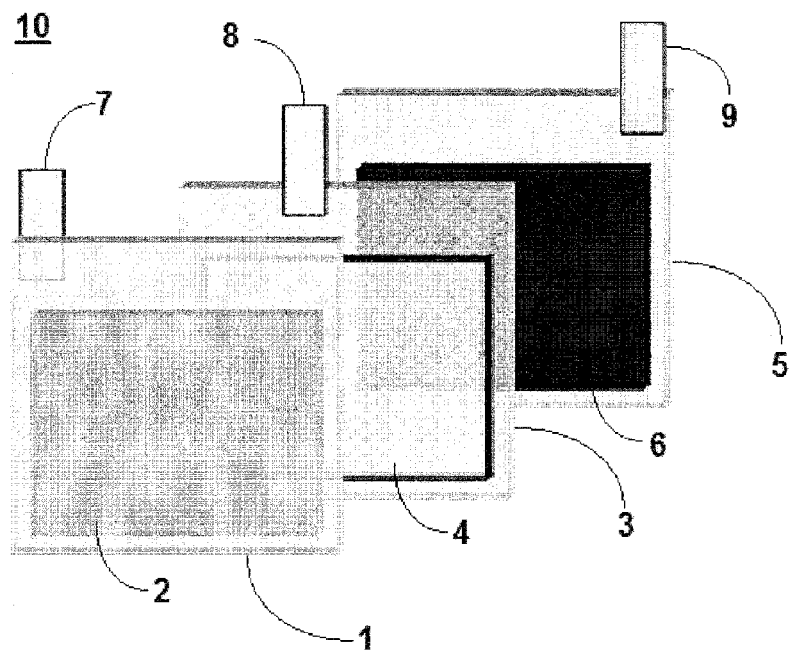
FIG. 1 is a schematic of an absorptive/transmissive window-like display device according to an embodiment of the invention.

In one embodiment of the invention, the device 10 can be a transmissive window-type, as illustrated in FIG. 1. A first working electrode 1 comprises a transmissive conductor on glass or plastic, for example, indium tin oxide (ITO) on glass or plastic or poly(3,4-ethylendioxythiophene):poly(styrenesulfonate) (PEDOT:PSS) on glass or plastic, where an electrochromic active layer 2, coats the inward face of electrode 1. An electrochromic polymer 2 can provide the conductivity of the electrode, although for illustration of this embodiment, the electrode includes an additional conductive material. The first electrode is in electrical contact with a second electrode 3 comprising a transparent conductor 4 on a porous membrane, for example, PEDOT:PSS coated onto a transparent membrane. The transmissive porous electrode 3 is coated with a redox active layer 4 that does not change color yet undergoes an electrochemical redox reaction and acts to balance charge during switching. In addition to conjugated polymers, other electroactive redox materials can be used to balance the charge during switching. Polymers that can be used as the electroactive redox material layer 4 include redox polymers. Redox polymers have specific spatially and electrostatically isolated electrochemically active sites where electroactivity is highly localized. A typical redox polymer consists of a system where a redox-active transition metal based pendant group is covalently bound to some sort of polymer backbone, which can be conjugated or non-conjugated. Non-limiting examples of redox active polymers that can be employed in embodiments of the invention include: poly(vinyl ferrocene) and copolymers thereof; poly(vinyltripyridyl cobalt dicloride) and copolymers thereof; poly(4-vinylpyridyl osmium bis-bipyridyl dichloride) and copolymers thereof; poly(pyrrole-co-N-benzyl ruthenium bis-bipyridyl chloride); poly(N-2-cyanoethyl-3,4-propylenedioxypyrrole) and polymers bearing the redox-active 2,2,6,6-tetramethylpiperidin-N-oxyl group such as poly(2,2,6,6-tetramethylpiperidinyloxy-4-yl methacrylate) and poly[2,3-bis(2,2,6,6-tetramethylpiperidine-N-oxycarbonyl)-norborene].

An electroactive polymer 4 can be coated on one or both sides of the membrane to provide efficient charge balance and switching. Additionally, rather than a non-color switching polymer, the electroactive polymer 4 of the transmissive porous electrode 3 can be an electrochromic polymer, such as an anodically coloring polymer that switches complementary to a cathodically coloring polymer on a working electrode, for example transmissive electrode 1. Generally, cathodically coloring polymers are considered to have a colored neutral state and a transmissive, essentially colorless, oxidized state, and, generally, anodically coloring polymers are considered to be essentially colorless in the neutral state and become colored upon oxidation. Some electrochromic polymers used in embodiments of the invention can be colored in the neutral state and colored in the oxidized state, and can be used in place of one or both of the cathodically or anodically coloring polymers that display a colorless state. The device has a third transmissive electrode 5 as shown in FIG. 1. The third transmissive electrode 5 is a second electrochromic polymer-coated transparent working electrode with an inward facing electrochromic polymeric coating 6, is illustrated in FIG. 1. An electrolyte is dispersed between the layers and can be a gel electrolyte, solid electrolyte, or ionic liquid. Although the electroactive layer 6 is generally an electrochromic polymer, other electroactive materials can be used, for example, transition metal complexes, viologen systems, or transition metal oxides. Electrical contacts 7, 8, and 9 can be used to electrically address electrodes 1, 3 and 5, respectively.

According to embodiments of the invention, transmissive electrodes 1 and 5 can include any conducting material that is sufficiently transparent and can have an electrochromic material 2 and 6 polymerized upon, deposited on, or cast upon at least one of its surfaces. In some embodiments of the invention, the electrochromic material can be the conducting material and can be supported on a transparent material, which can be a non-conductor. For example, the electrochromic material can be deposited on a conducting glass, such as ITO, a conducting polymer, such as PEDOT:PSS, a thin metal, such as gold, or a transparent carbon, such as a single-walled carbon nanotube (SWCNT) film. The supporting transparent material can be, for example, glass, or a transparent plastic, such as polycarbonate or poly(methyl methacrylate). Porous membranes used in the transmissive porous electrode 3 can be a transparent polymer or glass in the form of a membrane or other porous structure where it is coated with a conducting material, such as: a conducting polymer, such as PEDOT:PSS; a very thin metal, such as gold; or a transparent carbon, such as a single-walled carbon nanotube (SWCNT) film. When the conducting material has sufficient mechanical integrity and is porous, a supporting porous structure is not necessary. The gel electrolyte can be: an organic medium soluble salt solution, for example a tetrabutylammonium perchlorate in poly(methyl methacrylate)/propylene carbonate solution; an ionic liquid, such as tetraalkylammonium, dialkyl imidazolium, alkylpyridinium, dialkylpyridinium, and salts of non-nucleophilic anions, such as hexafluoroantimonate, hexafluorophosphate, tetrafluoroborate, triflate, and bis(trifluoromethanesulfonyl)imide anion; aqueous or hydrogel based electrolytes, or other viscous or solid electrolytes.

In the absorptive/transmissive embodiment of the invention introduced above, and illustrated in FIG. 1, electrode 1 and electrode 5, the active working electrodes, address a common counter electrode, porous electrode 3, and can be simultaneously and independently controlled (for example using a bipotentiostat). By combining two independently controlled electrochromic materials comprising working electrodes in the device, a wide variety of colors are available by additive color mixing of the colors from the two electrochromic materials. Additionally, when both working electrodes can exhibit a transmissive state, the device can display multiple colors and a transmissive state.

Figure 2:
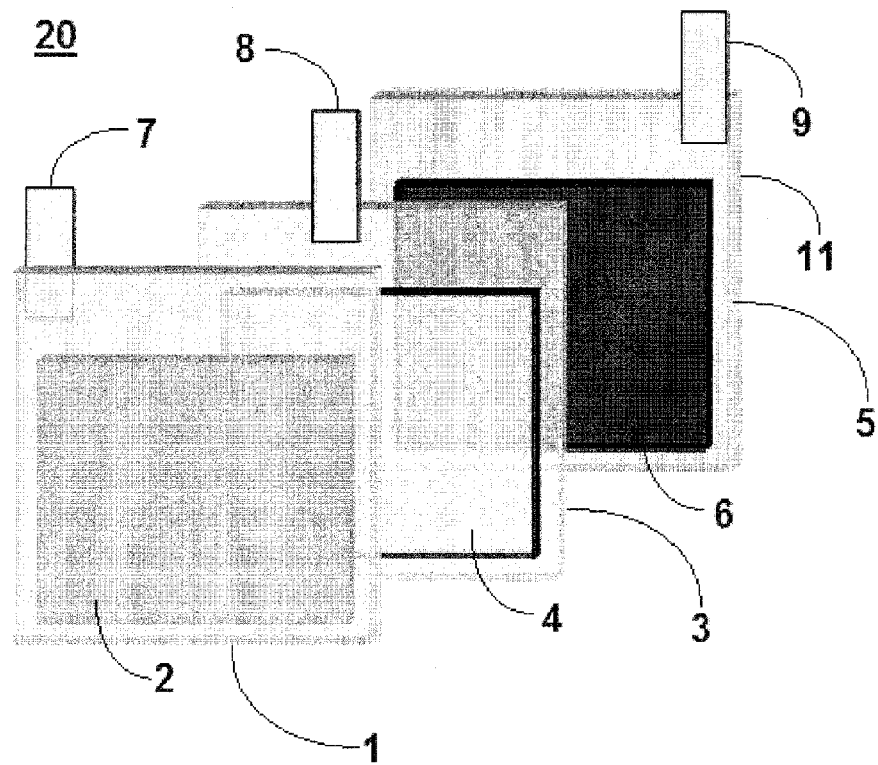
FIG. 2 is a schematic of an absorptive/reflective device according to an embodiment of the invention.

An absorptive/reflective device 20, according to an embodiment of the invention is illustrated in FIG. 2. This absorptive/reflective device has common features of the absorptive/transmissive device illustrated in FIG. 1, with the exception that transmissive electrode 5 has a reflective coating 11 deposited on its outward side. The reflective coating 11 can be a metallic mirror-like specular material, such as aluminum, or a diffuse reflective material, such titanium white.

Additionally, the device can be longer wavelength (near-IR, mid-IR, microwave) switching where the electrode 1 is transparent to the longer wavelengths (such as SWNT on glass or plastic in the near-IR). In this example, the electrochromic switching of the polymers in the near-IR (particularly at the telecommunications wavelengths of 1310 and 1550 nm) are of interest for applications such as variable optical attenuators.

Figure 3:
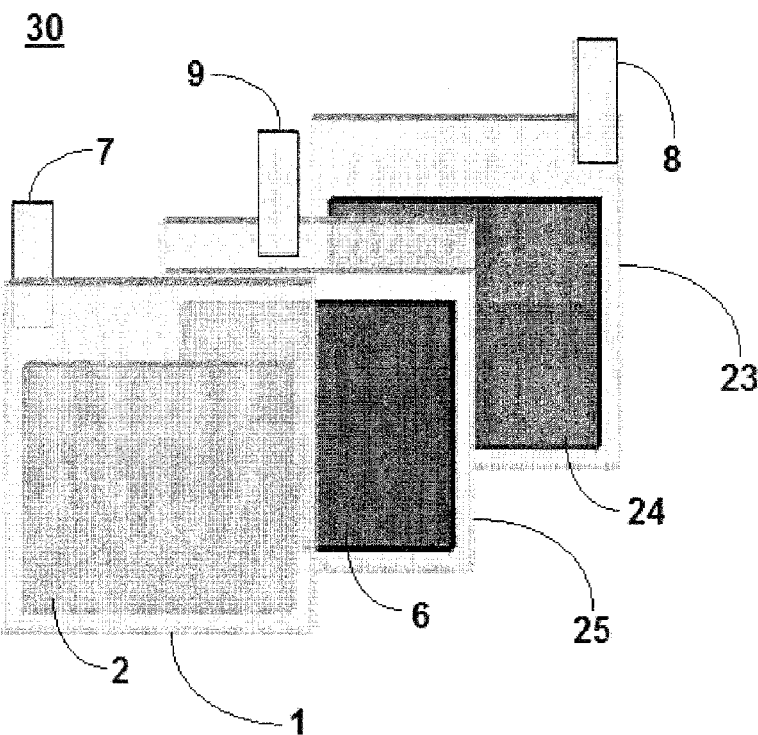
FIG. 3 is a schematic of an absorptive/reflective device according to an embodiment of the invention.

Another embodiment of the invention is illustrated in FIG. 3, which is an absorptive/reflective display device 30 where reflective electrode 25 is a centrally situated porous working electrode 25. Electrode 1 is a transmissive working electrode coated with an electrochromic layer 2 that is inward facing, as is common with the above described embodiments of the invention illustrated in FIGS. 1 and 2. However, in this embodiment, electrode 25 is a porous reflective electrode, such as a gold-coated porous polycarbonate membrane. The porous membrane can be any membrane that allows ion diffusion and can be coated with a reflective material on the side opposite an electroactive polymer, which is coated with an electroactive material 6 on the face directed toward Electrode 1. The reflective material can be any reflective metal that is stable as an electrode, for example gold or palladium. The reflective metal can be deposited by thermal evaporation or electroless plating techniques. Electrode 23, as shown in FIG. 3, is hidden behind the reflective porous electrode 25 and acts as the common counter electrode. This electrode 23 can be any conductive substrate and can be coated with an electroactive material 24. Any color exhibited by the electroactive material 24 on electrode 23 does not affect the colors exhibited by the device 30 and only lends charge balancing properties to the device. The colors displayed by the device of FIG. 3 are combinations of the electrochromic materials 2 and 6 coated on transparent electrode 1 and reflective electrode 25.

Figure 4:
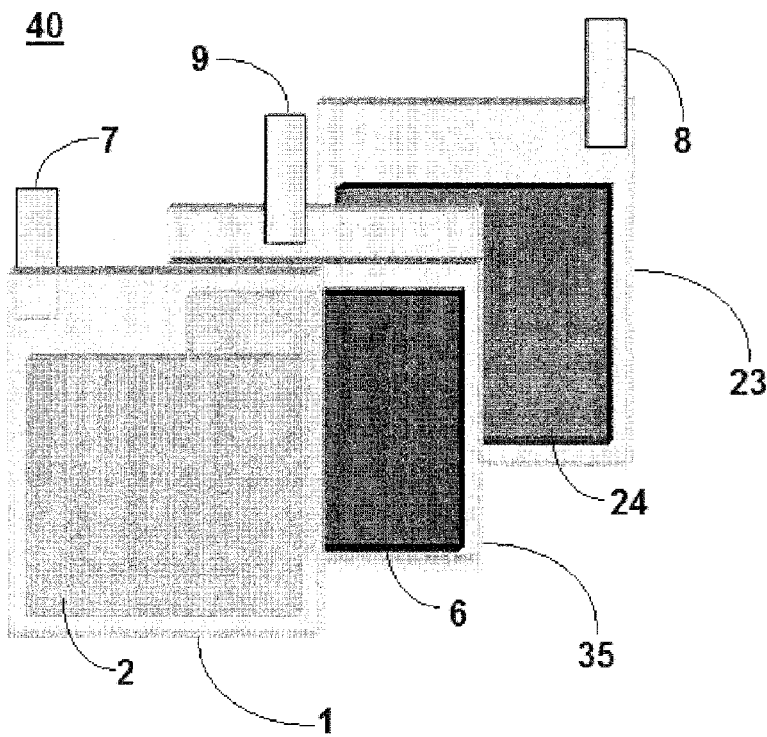
FIG. 4 is a schematic of an absorptive/reflective device according to an embodiment of the invention.

Another embodiment of the invention, shown in FIG. 4, is another absorptive/reflective device 40, where the design differs from that of the embodiment illustrated in FIG. 3, as the reflective electrode 35 is a conductive opaque membrane rather than a mirror-like reflective porous electrode. In this embodiment, the working electrode 35 can be any type of opaque porous membrane coated with a transmissive electroactive material such as a polymer. For example, the conductive opaque membrane can be a cellulose membrane soaked with PEDOT:PSS or coated with a layer of ITO by sputter-deposition. Reflection off of this electrode 35 is diffuse. In one embodiment, the opaque membrane provides a "white" color permitting a paper-like display, and, in other embodiments, colors could be displayed.

Alternately, to the devices described above, in other embodiments of the invention the counter electrode does not require a conductive polymer, but can be any conductor. Such a counter electrode 3, in a device as illustrated in FIGS. 1 and 2, can be a transparent material, or it can be effectively transparent due to being partitioned, such as a conducting grid, for example, a grid of thin metallic wires, where the conductor is transparent, semitransparent or opaque, where the construction of the grid permits a sufficiently large amount of light to pass through the grid and device. Particularly for applications where the rate of switching of colors need not be rapid, a grid or other counter electrode structure that is optically non-continuous can be employed. In other embodiments of the invention, a central electrode, equivalent to the counter electrode 3 as in FIGS. 1 and 2, can be conductive on both surfaces, need not be porous and two electrolytes can be used on each side of the electrode, such that electrical connectivity between each working electrode and the counter electrode can be established. Where the electrode is not porous, the electrolytes may be the same or different. The electrochromic polymer is conveniently a continuous coating on the working electrodes, which can be either transmissive or reflective; however, the electrochromic material can be non-continuous. When the electrochromic material is non-continuous, the device can allow one additive and one non-additive color to be observed in a random or a specific pattern on the display, or, when both electrochromic materials are patterned, the alignment of the patterns can be such that separate colors from both electrochromic materials are displayed, only the additive color of the two materials are displayed, or some combination of separate and additive colors.

The inventive device can be effectively composed of solid materials, when non-flowing gels and solid materials are used. When the device contains any electrolyte, electrochromic material, or other component that is fluid, a means of containment is included. The means of containment can be a transparent casing around the entire device, which permits electrical contacting to the working and counter electrodes, or can be a sealant that bridges between non-porous electrodes such that any fluid is contained between non-porous electrodes. Additionally, the electrodes can be spaced from one another by a set distance. Any method can be employed to fix the electrodes with the desired space including: fixing by a slotted frame; separating by a transparent membrane; using a gasket around the edges of the device; or placing transparent beads between the electrodes to fix a uniform and desired spacing.

The display devices are useful for a wide variety of displays, having advantages of mechanical flexibility, low operating voltages, high optical contrast, in addition to an ability to access a broad palette of colors by independently applying a potential to multiple active films. As a single device provides a variety of colors, the number of devices or pixels in a device required for a display can be reduced. Reduction of the number of devices or pixels needed, and the relative ease of producing a device using the electrochromic polymers of the invention, has the potential to significantly lower the cost of producing a display. In addition to displays, the devices of the present invention can be used for electrochromic windows, where the colors and light intensity allowed through the window can be varied in an automatic or manual fashion.

Although the invention is generally described herein for embodiments including two working electrodes and one counter electrode, other embodiments can include multiple working electrodes with different electrochromic material and can employ a plurality of counter electrodes. The disposition of electrodes must be in a manner where electrical potentials can be applied independently between a working electrode and a counter electrode and where all necessary electrodes are effectively transparent, for example, one electrode can be reflective for a reflective device and all other electrodes are transparent, and at least one electrolyte comprising material can be disposed between the working and counter electrodes to which a given potential is applied. The proper disposition and construction of the multiple electrodes can be readily appreciated by those skilled in the art in reference to the embodiments described above.

For example in one embodiment of the invention, three primary color neutral electrochromic polymers, red, green and blue that switch to a transmissive state upon doping can be used to form an electrochromic full color display. Red, green and, blue electrochromic polymers are sprayed onto transparent electrodes as color filters. When all of the polymers are brought to their neutral-colored states, the secondary subtractive colors red, green and blue (or primary subtractive colors cyan, magenta and yellow) will absorb over the entire visible range to block the light, rendering the electrochromic device comprised of the overlapping working electrodes effectively black. A desired intensity of the transmitted light is achieved by precisely controlling the doping levels of the electrochromic polymers. When all the electroactive polymers on the working electrodes are fully doped, the device appears clear and transmits most or all of the spectrum of light, such that the observer or detector can readily discern the difference from the neutral state. An exemplary experimental 5-electrode electrochromic device is given below.

Recently, some of the inventors demonstrated analytically, that by using a pair of complementary cathodically coloring polymers with bipotentiostatic control, a full palette of colors was possible, Unur et al., "Dual-Polymer Electrochromic Film Characterization Using Bipotentiostatic Control" *Chemistry of Materials,* 2008, 20(6), 2328 and Unur et al., "Dual-Polymer Electrochromic Film Characterization Using Bipotentiostatic Control" *Polymer Preprints,* 2007, 48(1), 42. These documents are incorporated by reference herein. The systematic variation of color states from pairs of electrochromic conjugated conducting polymers was demonstrated where simultaneous spectroelectrochemical and colorimetric characterization of the resulting color summation was performed. The colors and color combinations that can be displayed by the devices of the invention include, but are not limited to those disclosed in these references.

Electrochromic polymers can be used as the electrochromic materials, where, for example, an electrochromic polymer can be a conjugated conducting polymer. In many of the embodiments of the invention one electrochromic polymer is coated as part of one working electrode and another electrochromic polymer is coated on another working electrode. The two electrochromic polymers are chosen to independently transition between different colored states or a colored state and an effectively colorless state by applying potentials independently to the two electrochromic polymers. In this manner, the light that is transmitted through the two electrochromic polymers is the result of the additive colors of the two polymers at the applied potentials. For example, when one electrode has poly(3,4-ethylenedioxythiophene) (PEDOT) and the other electrode has poly(3,4-propylenedioxypyrrole) (PPropOP) as the electrochromic polymer coatings, when viewed independently in their neutral states they display the colors blue ($L^*=64$ $a^*=-5$ $b^*=-38$) and orange ($L^*=76$ $a^*=31$ $b^*=75$), respectively, but when viewed in combination produce an additive red/brown color ($L^*=59$ $a^*=25$ $b^*=50$), where $L^*$, $a^*$, and $b^*$ are the CIELAB color designations representing the lightness of the color ($L^*=0$ indicates black and $L^*=100$ indicates white), the color position between red/magenta and green (negative $a^*$ values indicate green while positive $a^*$ values indicate magenta) and color position between yellow and blue (negative $b^*$ values indicate blue and positive $b^*$ values indicate yellow).

Among electrochromic polymer pairs that can be employed for the fabrication of the display devices are PEDOT, PPropOP and dihexyl substituted poly(3,4-propylenedioxythiphene) (PPropOT-$Hx_2$) as shown below. These polymers all display a highly colored neutral state and a highly transparent fully oxidized, doped, state. Tables 1 and 2, below, illustrate the wide variety of colors that are possible from two different paired films of these polymers using CIELAB color designations. In all cases the films on ITO glass electrodes were prepared by either direct electropolymerization on the electrode, with PEDOT and PPropOP, or spray coated from a toluene solution onto the electrode, with PPropOT-$Hx_2$. Although the combination of two electrochromic polymers is used to illustrate the color control by the addition of color from films where the potential to each film can be independently controlled, the use of three or more working electrodes comprising different electrochromic polymers can be used. When multiple polymers are used, often, but not necessarily, at least one of the polymers has a transparent state that can be achieved in either the neutral or doped state.

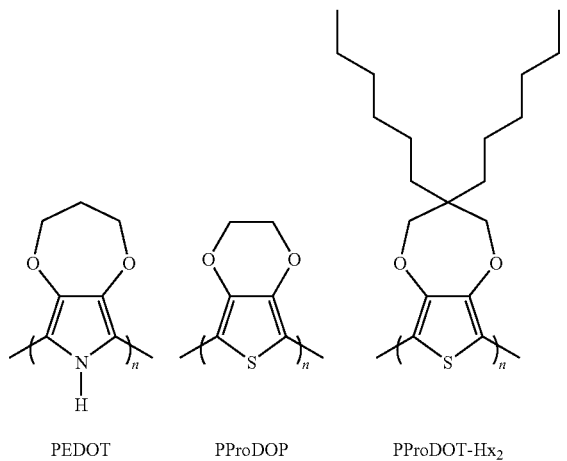

PEDOT　　　PProDOP　　　PProDOT-Hx$_2$ lenedioxypyrroles; dialkyl derivatized poly(3,4-alkylene-dioxythiophenes); dialkoxy derivatized poly(3,4-alkylene-dioxythiophenes); N-alkyl poly(3,4-alkylenedioxypyrroles); poly(bis-alkylenedioxythiophene-arylenevinylene); poly(bis-alkylenedioxythiophene-benzothiadiazole); and poly(bis-(3,4-alkylenethiophene)-N-alkyl carbazole), where alkylene can be ethylene, propylene or butylene, alkyl can be any $C_1$ to $C_{20}$ alkyl, alkoxy can be any $C_1$ to $C_{20}$ alkoxy or an oligo(alkyleneoxide), and arylene can be phenylene, naphthylene, substituted phenylene or substituted naphthylene. Other electrochromic polymers are known by those skilled in the art that can be used in the novel electrochromic devices of the present invention. Additionally, other electrochromic materials can be used in conjunction with or in place of one or more of the electrochromic polymers. Among materials that can be used or adapted for use in the electrochromic devices of the present invention include transition metal oxides, such as vanadium oxide or tungsten trioxide, viologens, such as 4,4'-dimethyl viologen or 4,4'-diphenyl viologen, transition metal complexes, such as Prussian Blue or tris(2,2'-bipyridine) ruthenium salts. Again, other electrochromic materials are known by those skilled in the art can be used in the novel electrochromic devices of the present invention.

TABLE 1

L* (top) a* (middle) b* (bottom) color coordinates for PProDOP/PEDOT films on ITO in 0.1 M LiClO$_4$/PC vs. Fc/Fc$^+$ for independently applied potentials in V.

| PProDOP | | PDOT | | | | | | |
|---|---|---|---|---|---|---|---|---|
| | | −1.35 V | −1.20 V | −1.05 V | −0.90 V | −0.75 V | −0.60 V | −0.45 V |
| | | L* = 64 | L* = 63 | L* = 64 | L* = 64 | L* = 65 | L* = 70 | L* = 79 |
| | | a* = −5 | a* = −6 | a* = −6 | a* = −6 | a* = −6 | a* = −4 | a* = −2 |
| | | b* = −37 | b* −38 | b* = −37 | b* = −37 | b* = −36 | b* = −28 | b* = −17 |
| −1.35 V | L* = 76 | L* = 59 | L* = 56 | L* = 58 | L* = 56 | L* = 59 | L* = 58 | L* = 68 |
| | a* = 31 | a* = 25 | a* = 25 | a* = 25 | a* = 26 | a* = 26 | a* = 28 | a* = 30 |
| | b* = 75 | b* = 50 | b* = 43 | b* = 48 | b* = 44 | b* = 50 | b = *47 | b* = 64 |
| −1.20 V | L* = 76 | L* = 53 | L* = 51 | L* = 53 | L* = 51 | L* = 53 | L* = 52 | L* = 59 |
| | a* = 32 | a* = 25 | a* = 24 | a* = 25 | a* = 24 | a* = 26 | a* = 24 | a* = 29 |
| | b* = 74 | b* = 36 | b* = 27 | b* = 35 | b* = 27 | b* = 35 | b* = 27 | b* = 43 |
| −1.05 V | L* = 75 | L* = 58 | L* = 55 | L* = 50 | L* = 55 | L* = 59 | L* = 57 | L* = 67 |
| | a* = 31 | a* = 24 | a* = 24 | a* = 18 | a* = 24 | a* = 25 | a* = 26 | a* = 28 |
| | b* = 72 | b* = 43 | b* = 39 | b* = 14 | b* = 39 | b* = 47 | b* = 43 | b* = 59 |
| −0.90 V | L* = 68 | L* = 51 | L* = 50 | L* = 50 | L* = 50 | L* = 51 | L* = 52 | L* = 57 |
| | a* = 25 | a* = 19 | a* = 18 | a* = 19 | a* = 19 | a* = 19 | a* = 18 | a* = 21 |
| | b* = 50 | b* = 18 | b* = 15 | b* = 18 | b* = 16 | b* = 18 | b* = 14 | b* = 26 |
| −0.75 V | L* = 67 | L* = 56 | L* = 53 | L* = 59 | L* = 52 | L* = −56 | L* = −55 | L* = 64 |
| | a* = 11 | a* = 2 | a* = 6 | a* = 2 | a* = 8 | a* = 6 | a* = 10 | a* = 5 |
| | b* = 8 | B* = −17 | b* = −11 | b* = −15 | b* = −8 | b* = −11 | b* = −2 | b* = −1 |
| −0.60 V | L* = 73 | L* = 57 | L* = 56 | L* = 57 | L* = 57 | L* = 58 | L* = 59 | L* = 64 |
| | a* = 2 | A* = 2 | a* = 2 | a* = 1 | a* = 1 | a* = 1 | a* = 3 | a* = 2 |
| | b* = −5 | b* = −17 | b* = −15 | b* = −17 | b* = −16 | b* = −16 | b* = −11 | b* = −8 |
| −0.45 V | L* = 78 | L* = 60 | L* = 61 | L* = 61 | L* = 62 | L* = 62 | L* = 64 | L* = 67 |
| | a* = −1 | a* = 0 | a* = 0 | a* = 0 | a* = −1 | a* = 0 | a* = 0 | a* = 1 |
| | b* = −5 | b* = −18 | b* = −18 | b* = −18 | b* = −18 | b* = −17 | b* = −15 | b* = −11 |

Other electrochromic polymers that can be used for the inventive devices include: alkylenedioxythiophenes; alky-

TABLE 2

L* (top) a* (middle) b* (bottom) color coordinates for PProDOP/PProDOT-Hx$_2$ films on ITO in 0.1 M LiClO$_4$/PC vs. Fc/Fc$^+$ for independently applied potentials in V.

PProDOT-Hx$_2$

| PProDOP | −0.85 V<br>L* = 56<br>a* = 14<br>b* = −45 | −0.65 V<br>L* = 56<br>a* = 14<br>b* = −45 | −0.45 V<br>L* = 56<br>a* = 14<br>b* = −45 | −0.25 V<br>L* = 59<br>a* = 12<br>b* = −40 | −0.05 V<br>L* = 81<br>a* = 8<br>b* = −11 | 0.15 V<br>L* = 92<br>a* = −1<br>b* = −3 |
|---|---|---|---|---|---|---|
| −1.35 V L* = 76<br>a* = 31<br>b* = 75 | L* = 56<br>a* = 21<br>b* = 16 | L* = 54<br>a* = 23<br>b* = 16 | L* = 54<br>a* = 23<br>b* = 15 | L* = 55<br>a* = 22<br>b* = 14 | L* = 66<br>a* = 27<br>b* = 33 | L* = 72<br>a* = 24<br>b* = 39 |
| −1.20 V L* = 76<br>a* = 32<br>b* = 74 | L* = 55<br>a* = 21<br>b* = 15 | L* = 55<br>a* = 22<br>b* = 16 | L* = 55<br>a* = 22<br>b* = 15 | L* = 54<br>a* = 24<br>b* = 16 | L* = 67<br>a* = 26<br>b* = 35 | L* = 72<br>a* = 23<br>b* = 38 |
| −1.05 V L* = 75<br>a* = 31<br>b* = 72 | L* = 55<br>a* = 20<br>b* = 13 | L* = 53<br>a* = 22<br>b* = 15 | L* = 52<br>a* = 22<br>b* = 13 | L* = 55<br>a* = 22<br>b* = 14 | L* = 68<br>a* = 25<br>b* = 32 | L* = 72<br>a* = 22<br>b* = 37 |
| −0.90 V L* = 68<br>a* = 25<br>b* = 50 | L* = 52<br>a* = 16<br>b* = −2 | L* = 52<br>a* = 18<br>b* = 1 | L* = 52<br>a* = 17<br>b* = 1 | L* = 53<br>a* = 18<br>b* = 3 | L* = 65<br>a* = 20<br>b* = 21 | L* = 70<br>a* = 17<br>b* = 26 |
| −0.75 V L* = 67<br>a* = 11<br>b* = 8 | L* = 54<br>a* = 9<br>b* = −21 | L* = 53<br>a* = 11<br>b* = −18 | L* = 54<br>a* = 10<br>b* = −17 | L* = 55<br>a* = 11<br>b* = −14 | L* = 68<br>a* = 9<br>b* = 2 | L* = 73<br>a* = 4<br>b* = 2 |
| −0.60 V L* = 73<br>a* = 2<br>b* = −5 | L* = 57<br>a* = 7<br>b* = −28 | L* = 56<br>a* = 7<br>b* = −27 | L* = 57<br>a* = 7<br>b* = −25 | L* = 59<br>a* = 7<br>b* = −22 | L* = 72<br>a* = 5<br>b* = −6 | L* = 76<br>a* = 0<br>b* = −3 |
| −0.45 V L* = 78<br>a* = −1<br>b* = −5 | L* = 60<br>a* = 7<br>b* = −28 | L* = 58<br>a* = 8<br>b* = −28 | L* = 59<br>a* = 7<br>b* = −27 | L* = 60<br>a* = 8<br>b* = −24 | L* = 74<br>a* = 4<br>b* = −7 | L* = 79<br>a* = −1<br>b* = −4 |

In another embodiment of the invention, the electrochromic material of the working electrodes are SprayDOT™-Purple 101 (PPropOT-(CH$_2$COOC$_{12}$H$_{25}$)$_2$) and SprayDOT™-Purple 101 and SprayDOT™-Green 145 (P(EDOT$_2$(PropOT-(CH$_2$O(2-EtHx))$_2$)$_2$BTD)), whose structure are given below, are used to provide the primary colors. The preparation of P(EDOT$_2$(PropOT-(CH$_2$O(2-EtHx))$_2$)$_2$BTD) is disclosed in Beaujuge et al., *Nat. Mater.* 2008, 7, 795, which is incorporated herein by reference. SprayDOT™-Purple 101 and SprayDOT™-Green 145 are cathodically coloring polymers, SprayDOT™-Purple 101 switching from a deep magenta (L*=41 a*=22 b*=−48) to a highly transmissive gray/blue (L*=87 a*=−2 b*=−7) and SprayDOT™-Green 145 switching from a deep green (L*=60 a*=−23 b*=12) to transmissive sky blue (L*=84 a*=−4 77 b*=−6). Table 3, below, illustrates the variety of colors from the paired polymers using CIELAB color designations.

TABLE 3

L* (top) a* (middle) b* (bottom) color coordinates for SprayDOT ™-Purple 101 and SprayDOT ™-Green 145 films on ITO in 0.1 M LiClO$_4$/PC vs. Fc/Fc$^+$ for independently applied potentials in V.

| Purple 101 | Green 145 | | | | | | | |
|---|---|---|---|---|---|---|---|---|
| | −0.66 V<br>L* = 60<br>a* = −23<br>b* = 12 | −0.46 V<br>L* = 60<br>a* = −24<br>b* = 12 | −0.26 V<br>L* = 64<br>a* = −15<br>b* = 3 | −0.06 V<br>L* = 68<br>a* = −11<br>b* = −4 | 0.14 V<br>L* = 76<br>a* = −6<br>b* = −8 | 0.34 V<br>L* = 78<br>a* = 11<br>b* = −8 | 0.54 V<br>L* = 82<br>a* = 3<br>b* = −6 | 0.74 V<br>L* = 84<br>a* = −4<br>b* = −6 |
| −0.66 L* = 41<br>a* = 22<br>b* = −48 | L* = 21<br>a* = 3<br>b* = −28 | L* = 22<br>a* = 0<br>b* = −27 | L* = 22<br>a* = 10<br>b* = −33 | L* = 27<br>a* = 8<br>b* = −36 | L* = 28<br>a* = 15<br>b* = −44 | L* = 30<br>a* = 18<br>b* = −48 | L* = 31<br>a* = 19<br>b* = −49 | L* = 31<br>a* = 22<br>b* = −51 |
| −0.46 L* = 41<br>a* = 23<br>b* = −49 | L* = 22<br>a* = 5<br>b* = −29 | L* = 22<br>a* = 6<br>b* = −30 | L* = 23<br>a* = 8<br>b* = −34 | L* = 25<br>a* = 14<br>b* = −40 | L* = 27<br>a* = 16<br>b* = −45 | L* = 30<br>a* = 17<br>b* = −48 | L* = 31<br>a* = 18<br>b* = −49 | L* = 32<br>a* = 18<br>b* = −50 |
| −0.26 L* = 45<br>a* = 21<br>b* = −43 | L* = 23<br>a* = 3<br>b* = −27 | L* = 24<br>a* = 3<br>b* = −28 | L* = 25<br>a* = 6<br>b* = −32 | L* = 26<br>a* = 6<br>b* = −35 | L* = 27<br>a* = 16<br>b* = −44 | L* = 30<br>a* = 19<br>b* = −48 | L* = 32<br>a* = 18<br>b* = −48 | L* = 32<br>a* = 21<br>b* = −50 |
| −0.06 L* = 60<br>a* = 17<br>b* = −23 | L* = 28<br>a* = −1<br>b* = −20 | L* = 29<br>a* = 0<br>b* = −20 | L* = 30<br>a* = 1<br>b* = −24 | L* = 33<br>a* = 8<br>b* = −31 | L* = 36<br>a* = 11<br>b* = −36 | L* = 38<br>a* = 14<br>b* = −39 | L* = 40<br>a* = 15<br>b* = −39 | L* = 41<br>a* = 13<br>b* = −39 |
| 0.14 L* = 79<br>a* = 4<br>b* = −4 | L* = 42<br>a* = −9<br>b* = −3 | L* = 42<br>a* = −7<br>b* = −4 | L* = 43<br>a* = −3<br>b* = −8 | L* = 45<br>a* = 0<br>b* = −13 | L* = 50<br>a* = 4<br>b* = −18 | L* = 54<br>a* = 5<br>b* = −19 | L* = 56<br>a* = 8<br>b* = −19 | L* = 58<br>a* = 8<br>b* = −19 |
| 0.34 L* = 82<br>a* = 14<br>b* = −3 | L* = 51<br>a* = −20<br>b* = 7 | L* = 52<br>a* = −18<br>b* = 5 | L* = 54<br>a* = −11<br>b* = −1 | L* = 58<br>a* = −4<br>b* = −6 | L* = 63<br>a* = −4<br>b* = −11 | L* = 67<br>a* = −3<br>b* = −12 | L* = 70<br>a* = −3<br>b* = −11 | L* = 71<br>a* = −3<br>b* = −11 |
| 0.54 L* = 86<br>a* = 0<br>b* = −5 | L* = 54<br>a* = −21<br>b* = 5 | L* = 54<br>a* = −20<br>b* = 5 | L* = 56<br>a* = −16<br>b* = 0 | L* = 59<br>a* = −13<br>b* = −6 | L* = 65<br>a* = −9<br>b* = −12 | L* = 70<br>a* = −6<br>b* = −13 | L* = 73<br>a* = −5<br>b* = −12 | L* = 74<br>a* = −4<br>b* = −12 |
| 0.74 L* = 87<br>a* = −2<br>b* = −7 | L* = 55<br>a* = −22<br>b* = 6 | L* = 55<br>a* = −21<br>b* = 4 | L* = 57<br>a* = −15<br>b* = −1 | L* = 61<br>a* = −11<br>b* = −7 | L* = 66<br>a* = −8<br>b* = −12 | L* = 71<br>a* = −6<br>b* = −13 | L* = 74<br>a* = −6<br>b* = −12 | L* = 75<br>a* = −6<br>b* = −12 |

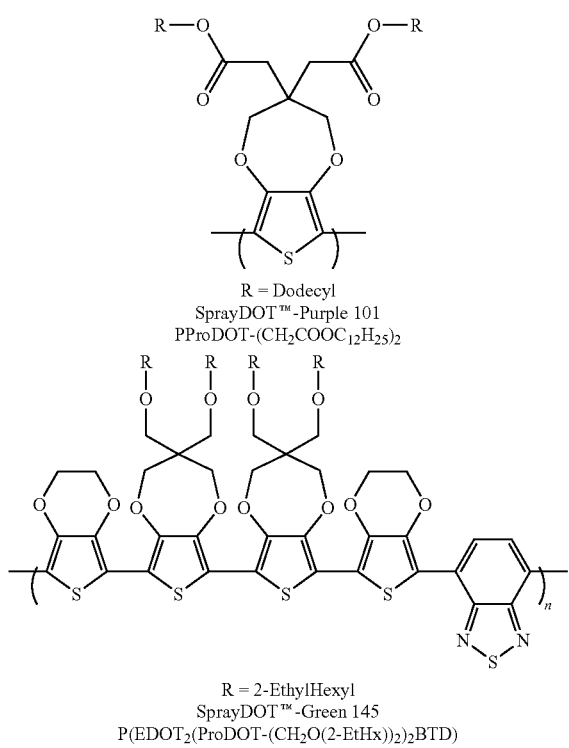

R = Dodecyl
SprayDOT™-Purple 101
PProDOT-(CH$_2$COOC$_{12}$H$_{25}$)$_2$

R = 2-EthylHexyl
SprayDOT™-Green 145
P(EDOT$_2$(ProDOT-(CH$_2$O(2-EtHx))$_2$)$_2$BTD)

Materials and Methods

Polymer Cyclic Voltammetry and Scan Rate Dependence

Figure 5:
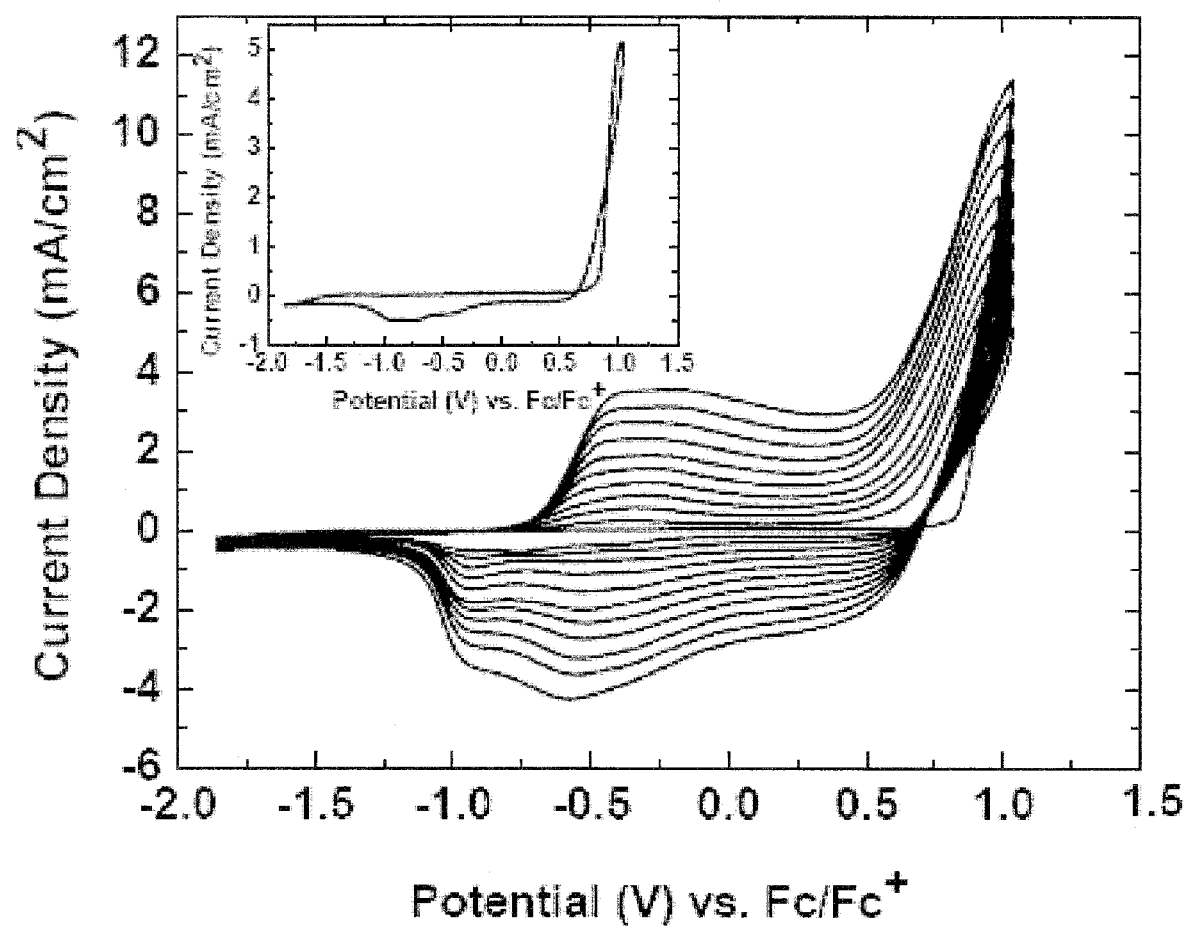
FIG. 5 shows repeated potential scanning during the electropolymerization of EDOT from 10 mM monomer in 0.1 M $LiClO_4/PC$ solution on a Pt-button electrode at a scan rate of 20 mV/s to form PEDOT.
Figure 6:
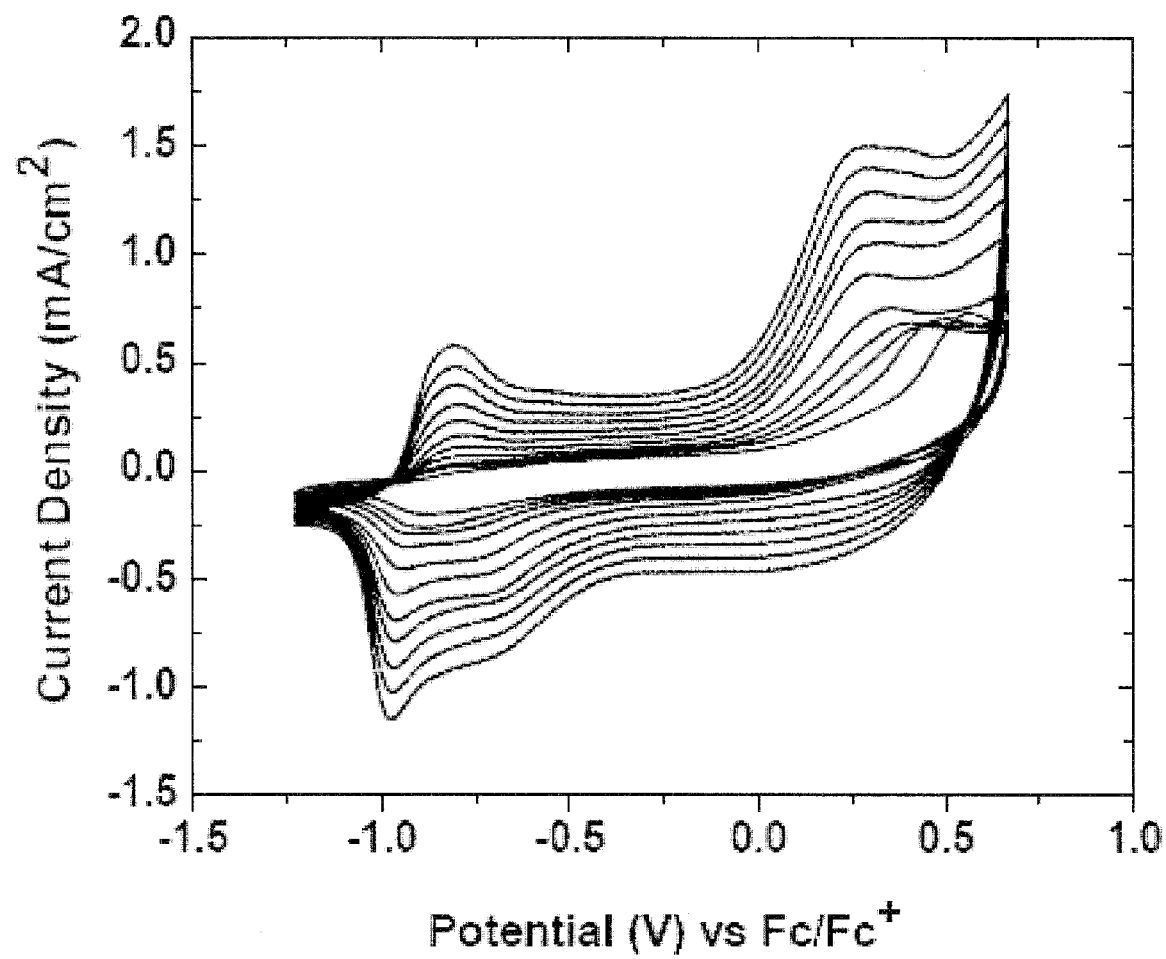
FIG. 6 shows repeated potential scanning during the electropolymerization of PropOP from 10 mM monomer in 0.1 M $LiClO_4/PC$ solution on a Pt-button electrode at a scan rate of 20 mV/s to form PPropOP.

In order to obtain thin films of the electrochromic polymers, both EDOT and PropOP were electrochemically polymerized onto Pt-button electrodes from a 0.1 M LiClO$_4$/PC solution containing 10 mM monomer by repeated scanning as shown in FIG. 5 and FIG. 6, respectively. During the first anodic scans, a single peak was observed corresponding to irreversible oxidation of the monomers indicating formation of radical cations (FIG. 5 inset). The peaks of monomer oxidation are observed at +1.02 V for EDOT and +0.56 for PropOP vs. Fc/Fc$^+$. Subsequent scanning shows evolution of a redox response at lower potentials attributed the polymer oxidation and charge neutralization. PPropOT-Hx$_2$ was drop-cast from a 5 mg/mL polymer/toluene solution onto a Pt-button electrode after being filtered through 0.45 μm PTFE filter.

Figure 7:
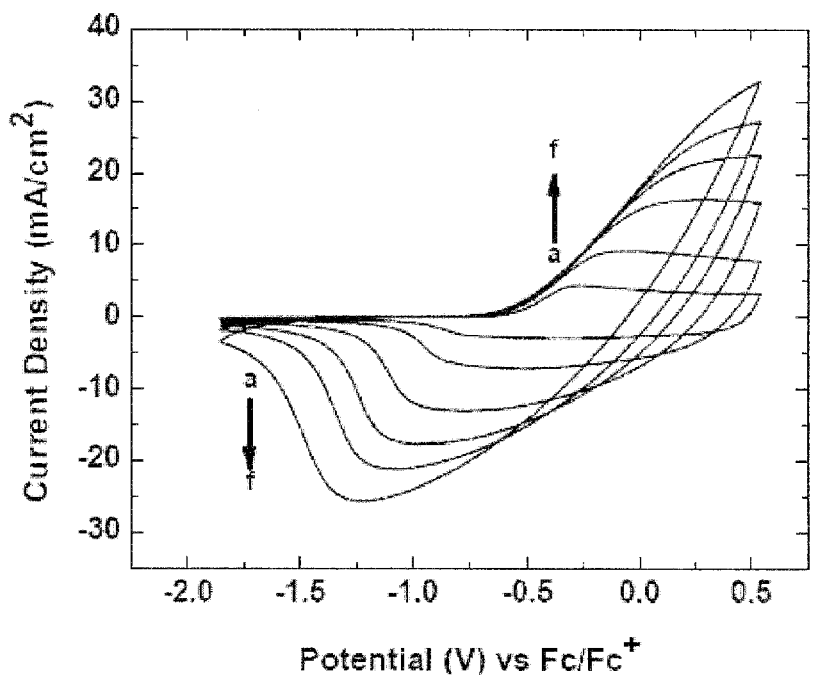
FIG. 7 shows cyclic voltammograms of PEDOT in 0.1 M $LiClO_4/PC$ at scan rates of (a) 20, (b) 50, (c) 100, (d) 150, (e) 200, and (f) 300 mV/s.
Figure 8:
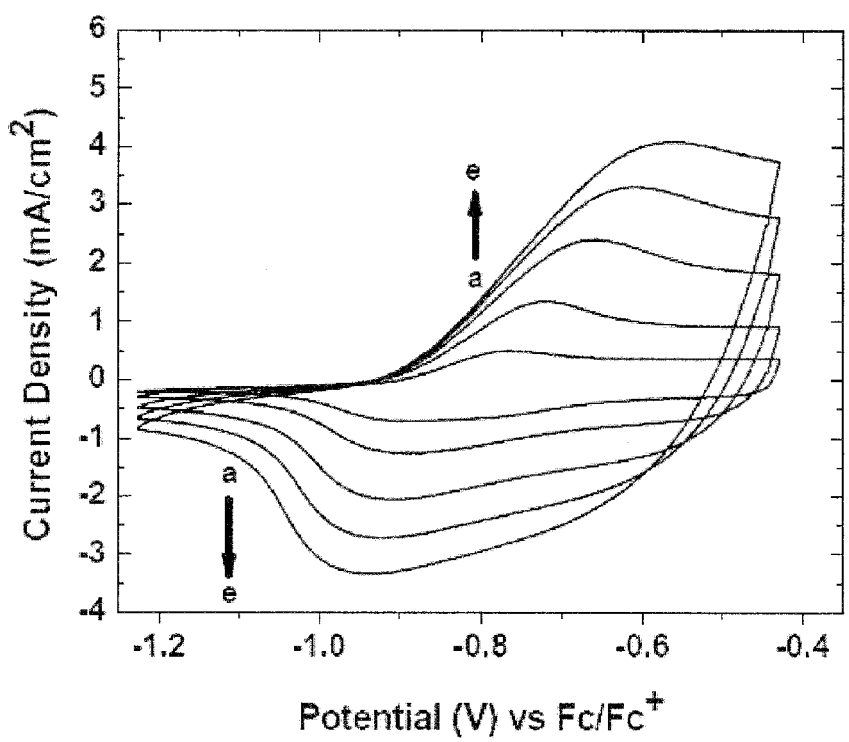
FIG. 8 Cyclic voltammograms of PPropOP in 0.1 M $LiClO_4/PC$ at scan rates of (a) 20, (b) 50, (c) 100, (d) 150, and (e) 200 mV/s.
Figure 9:
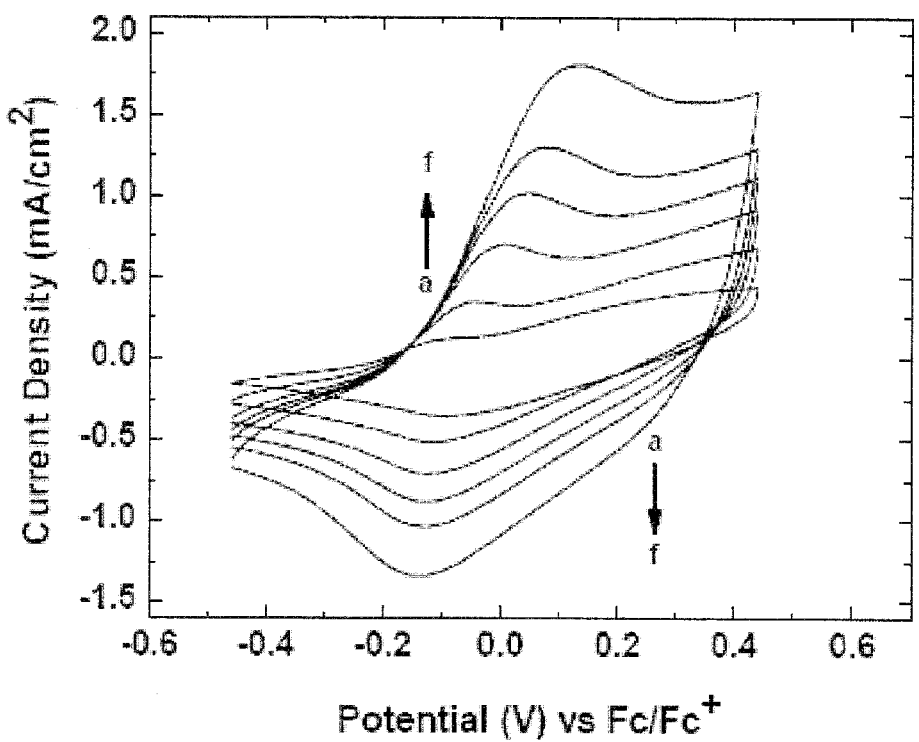
FIG. 9 shows cyclic voltammograms of PPropOT-$Hx_2$ in 0.1 M $LiClO_4/PC$ at scan rates of (a) 20, (b) 50, (c) 100, (d) 150, (e) 200, and (f) 300 mV/s. A film was prepared by drop-casting onto a Pt-button electrode from 5 mg/mL polymer/toluene solution.

After deposition, all films were rinsed with monomer-free electrolyte solutions and cyclic voltammograms (CVs) were recorded at scan rates ranging from 20 to 300 mV/s as shown in FIGS. 7, 8 and 9. A linear increase of the current with scan rate was observed for each film, indicative of a surface adhered electroactive polymer film. An important aspect observed in these experiments is that the current passing through the PEDOT film is an order of magnitude greater than the current passing through the PPropOP (prepared with the same number of deposition scans) and PPropOT-Hx$_2$ films. This illustrates that during the preparation of dual film devices, it is important to balance the overall amount of electroactive polymer on each electrode, usually using film thickness as the operational parameter, in order to obtain a balanced optical response.

Spectroelectrochemistry

Figure 10:
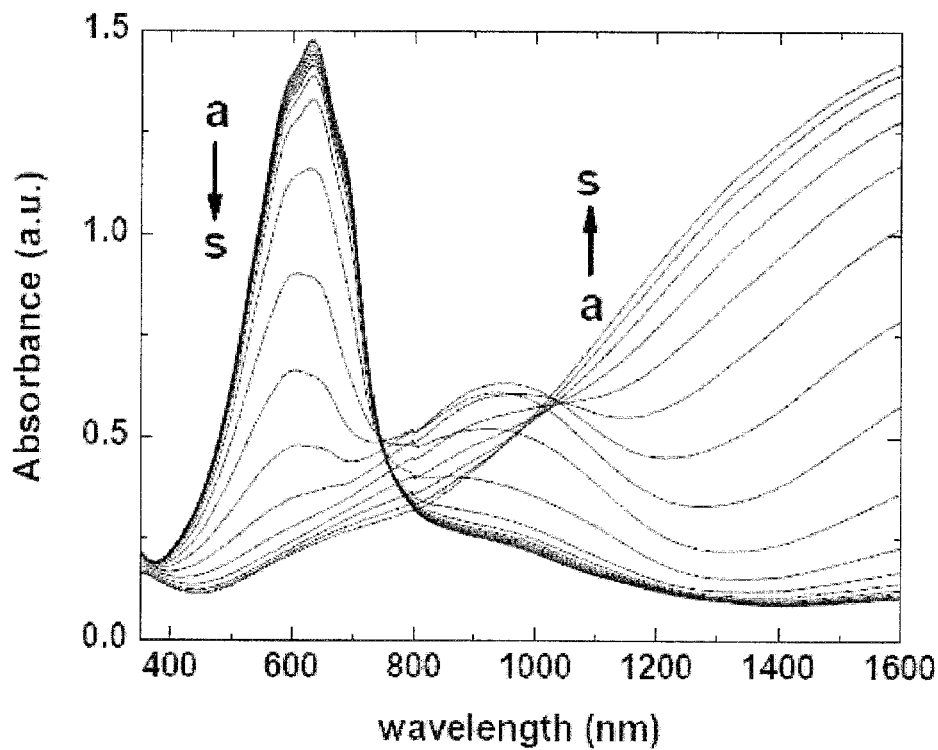
FIG. 10 shows composite spectra for the spectroelectrochemistry of potentiostatically deposited, redox switched, PEDOT film at applied potentials of (a) −1.45 to (s) +0.35 V vs. Fc/Fc$^+$ in increments of 0.1 V in 0.1 M $LiCLO_4/PC$ solution on an ITO/glass electrode.
Figure 11:
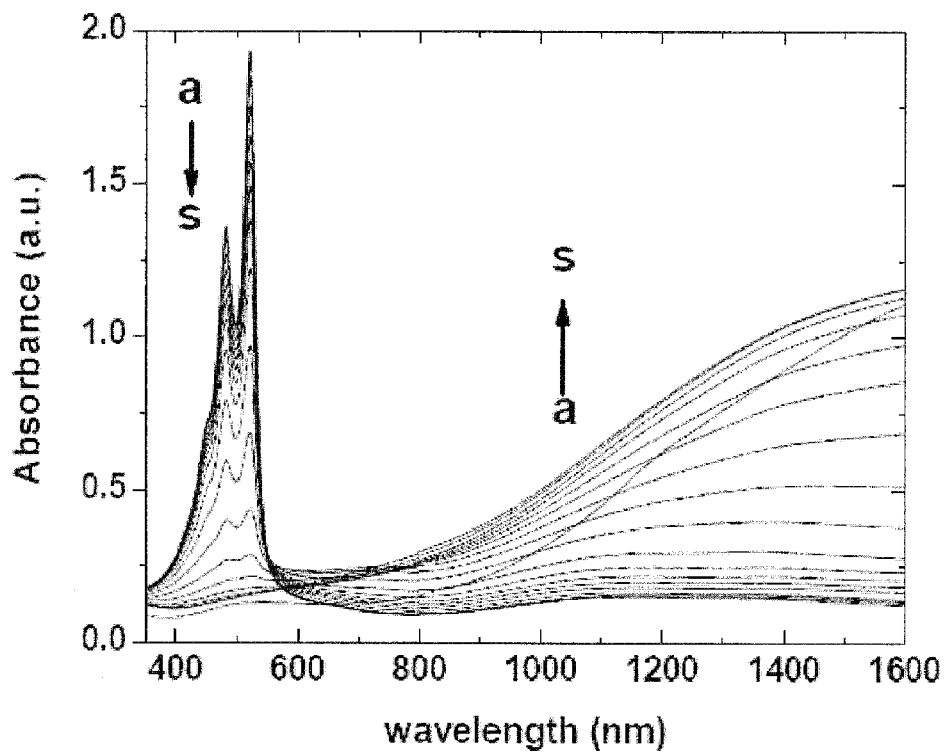
FIG. 11 shows composite spectra for the spectroelectrochemistry of galvanostatically deposited, redox switched, PPropOP film at applied potentials of (a) −1.7 to (s) +0.1 V vs. Fc/Fc$^+$ in increments of 0.1 V in 0.1 M $LiCLO_4/PC$ solution on an ITO/glass electrode.
Figure 12:
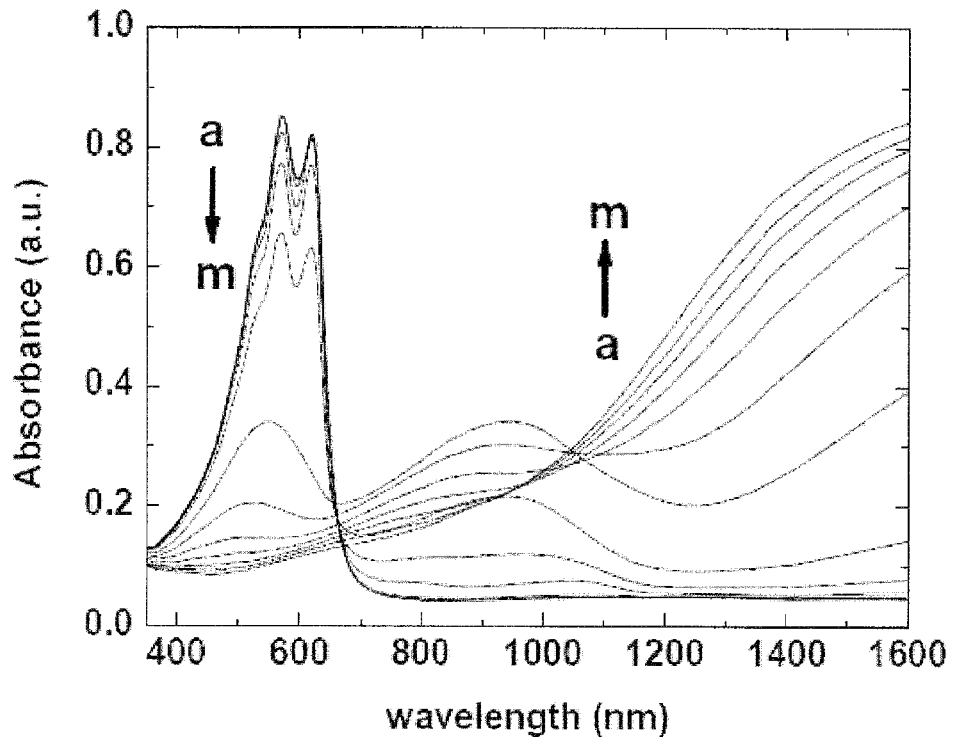
FIG. 12 shows composite spectra for the spectroelectrochemistry of spray-cast, redox-switched, PPropOT-$Hx_2$ film at applied potentials of (a) −0.67 to (m) +0.53 V vs. Fc/Fc$^+$ in increments of 0.1V, in 0.1 M $LiCLO_4/PC$ solution on an ITO/glass electrode.

Using the above cyclic voltammetry experiments as a means of determining the correct potential ranges for switching and evaluating the stability of the electroactivity of the polymer films, spectroelectrochemical and colorimetric experiments were conducted to elucidate the separate optical characteristics of the polymer films alone. Films were deposited on ITO coated glass slides potentiostatically for PEDOT (1.6 V for 20 s), galvanostatically for PPropOP (0.11 mA for 1000 s) and by spray casting (5 mg/mL from toluene) for PPropOT-Hx$_2$. The film thicknesses were adjusted to between 100-300 nm so that the absorbances of the polymer films at 2 in their neutral states were approximately equal. The spectroelectrochemical series for each of the polymer films are shown in FIGS. 10, 11 and 12. In their neutral states, PEDOT appears deep blue (absorbing between 1.6 and 2.75 eV), PPropOP appears orange (absorbing between 2.2 and 3.0 eV) and, PPropOT-Hx$_2$ appears purple (absorbing between 1.8 and 3.0 eV). As these polymer films are doped, charge carrier states emerge with the majority of the light absorption for each polymer being in the NIR which results in highly transmissive films. Note, in the spectroelectrochemical series for PPropOP, we step to +0.5 V which is substantially higher than the potential window used in the CV. This higher applied potential allowed full oxidizing of the film and attainment of the most transmissive form. This ability to form a transmissive state for each of these cathodically coloring polymers is important when considering them for use in electrochromic displays and absorption/transmission windows. Converting to transmittance, the Δ% T values at $\lambda_{max}$ (632 nm, 522 nm and 571 nm) are 55%, 73% and 65% for PEDOT, PPropOP and PPropOT-Hx$_2$, respectively.

Tandem Chronocoulometry and Chronoabsorptometry

Figure 13:
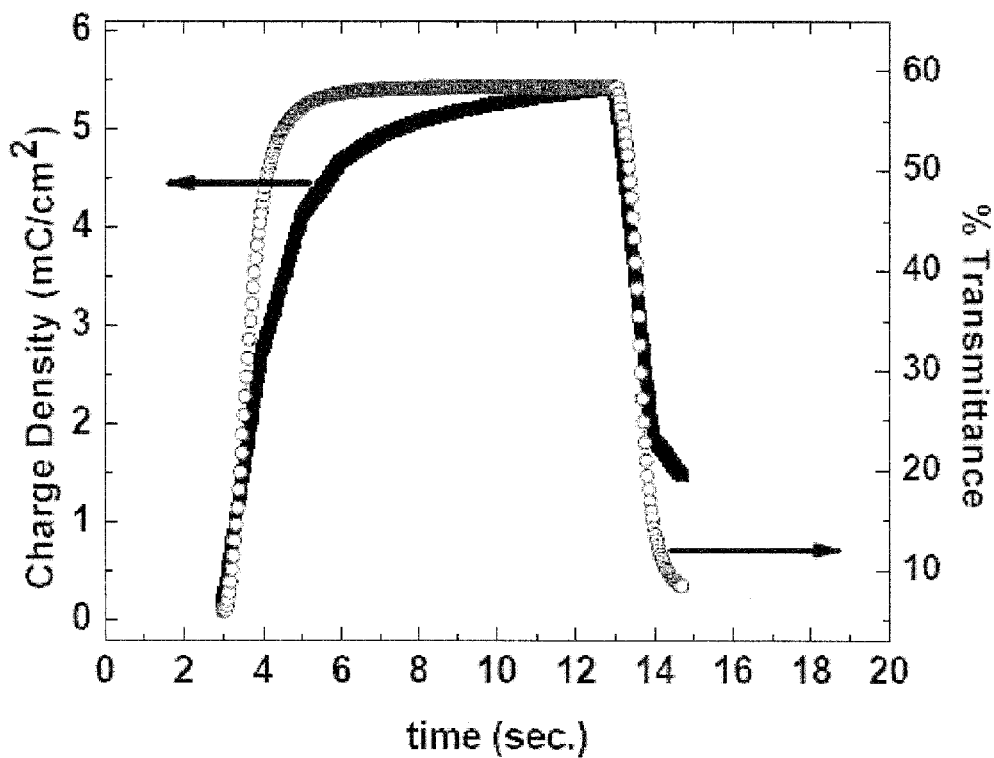
FIG. 13 shows tandem chronoabsorptometry and chronocoulometry spectra for PEDOT in 0.1 M $LiClO_4/PC$ solution. (−1.45 to +0.55 V vs. Fc/Fc$^+$, held for 10 s at each potential at 632 nm) on an ITO/glass electrode.
Figure 14:
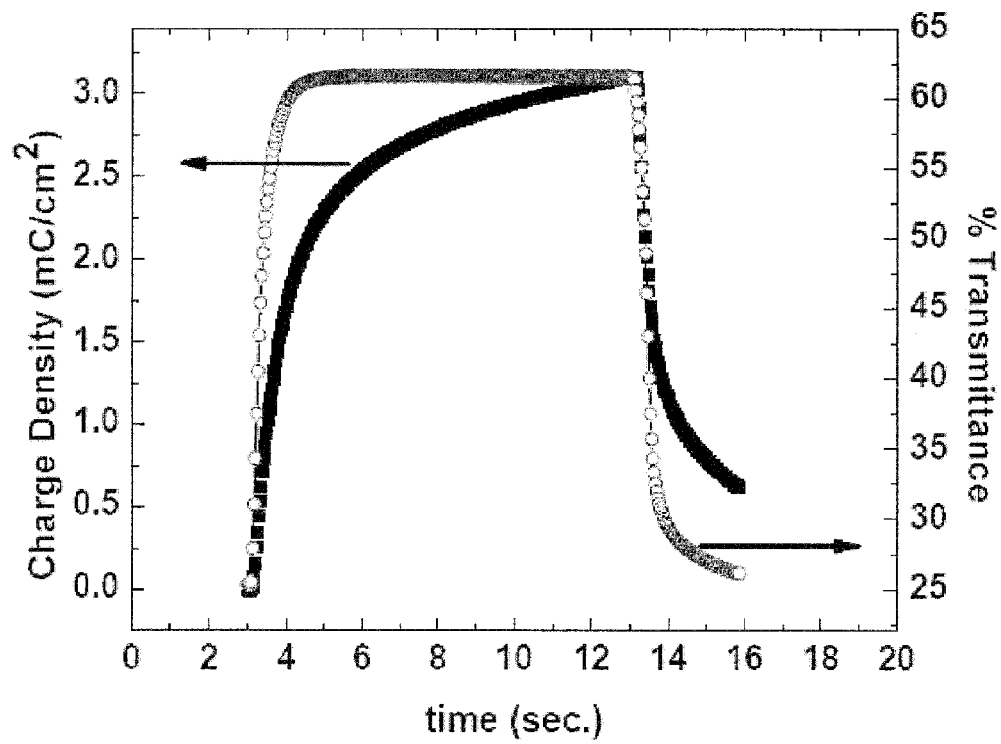
FIG. 14 shows tandem chronoabsorptometry and chronocoulometry spectra for PPropOP (−1.7 to +0.1 V vs. Fc/Fc, held for 10 s at each potential at 522 nm) in 0.1 M $LiClO_4/PC$ solution on an ITO/glass electrode.
Figure 15:
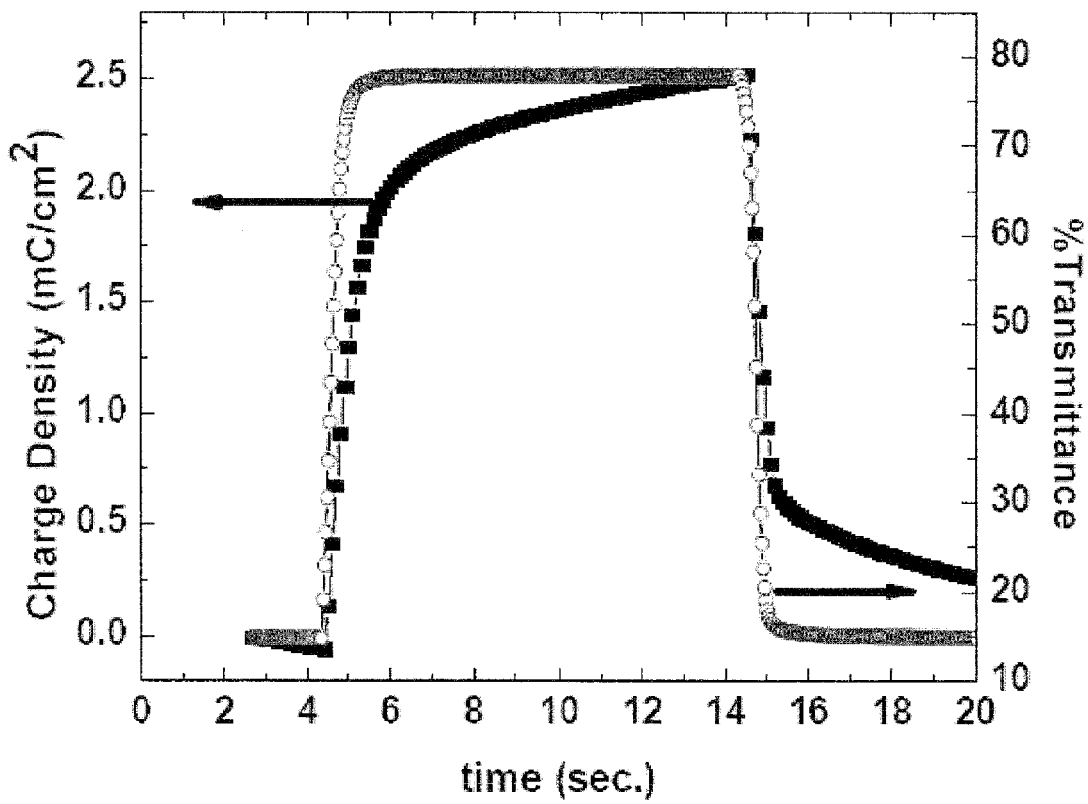
FIG. 15 shows tandem chronoabsorptometry and chronocoulometry spectra for PPropOT-$Hx_2$ in 0.1 M $LiClO_4/PC$ solution. (−0.67 to +0.53 V vs. Fc/Fc', held for 10 s at each potential at 571 nm) on an ITO/glass electrode.

Tandem chronoabsorptometry and chronocoulometry experiments allow calculation of composite coloration efficiency (CE). By choosing 95% of the optical density change, the transmittance of the reduced films is compared to that of oxidized films. The amount of time to reach 95% of the full optical density is chosen as nearly all of the optical change has occurred and a direct comparison of polymers that switch at different rates can be made. Polymer films with similar switching times and contrast ratios were chosen for application to the dual-film technique. The coloration efficiency for PEDOT is 280 cm$^2$/C and the 95% switch time is 1.7 s with a charge density of 3.4 mC/cm$^2$, while for PPropOP the coloration efficiency is 224 cm$^2$/C and the 95% switch time is 0.9 s with a charge density of 1.6 mC/cm$^2$, and for PPropOT-Hx$_2$ the coloration efficiency is 519 cm$^2$/C and the 95% switch time is 0.6 s with a charge density of 1.4 mC/cm$^2$ (FIGS. 13, 14 and 15). All three polymer films have substantial electrochromic switching in the sub-second time frame and are fully switched within two seconds.

Colorimetry

Figure 16:
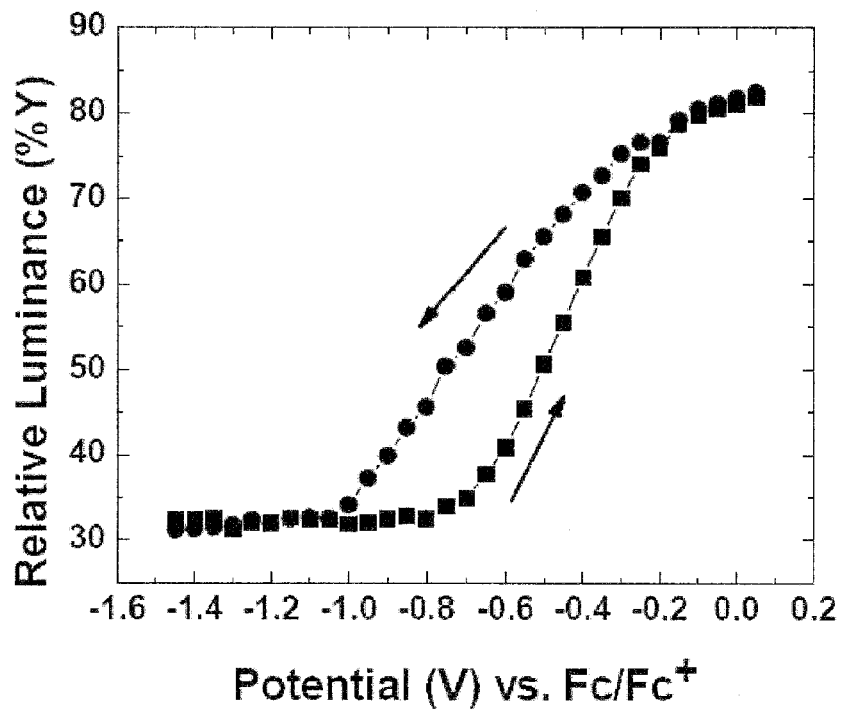
FIG. 16 shows a plot of the relative luminance as a function of applied potential of PEDOT in 0.1 M $LiClO_4$ solution on an ITO/glass electrode.
Figure 17:
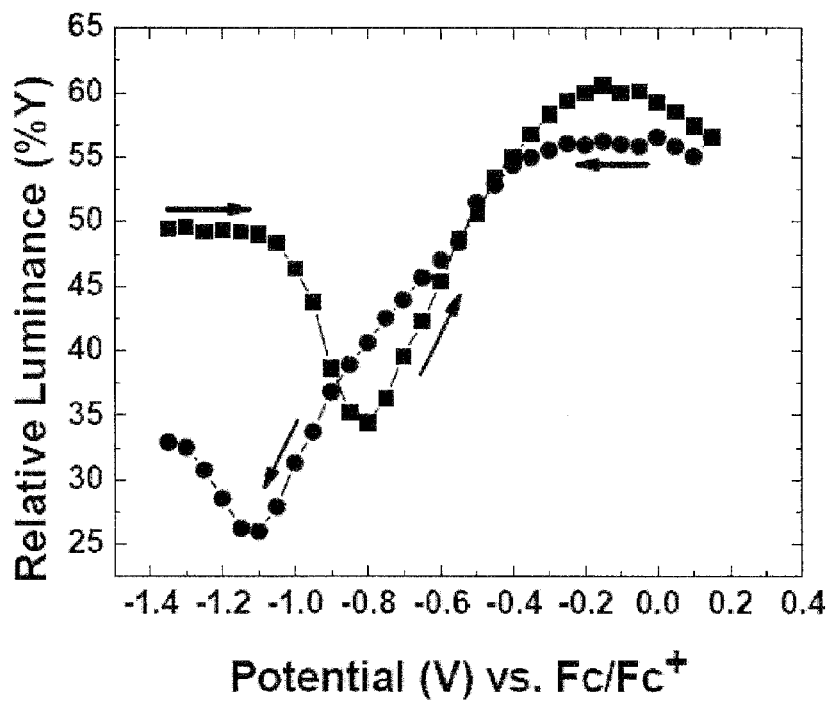
FIG. 17 shows a plot of the relative luminance as a function of applied potential of PPropOP in 0.1 M $LiClO_4$ solution on an ITO/glass electrode.
Figure 18:
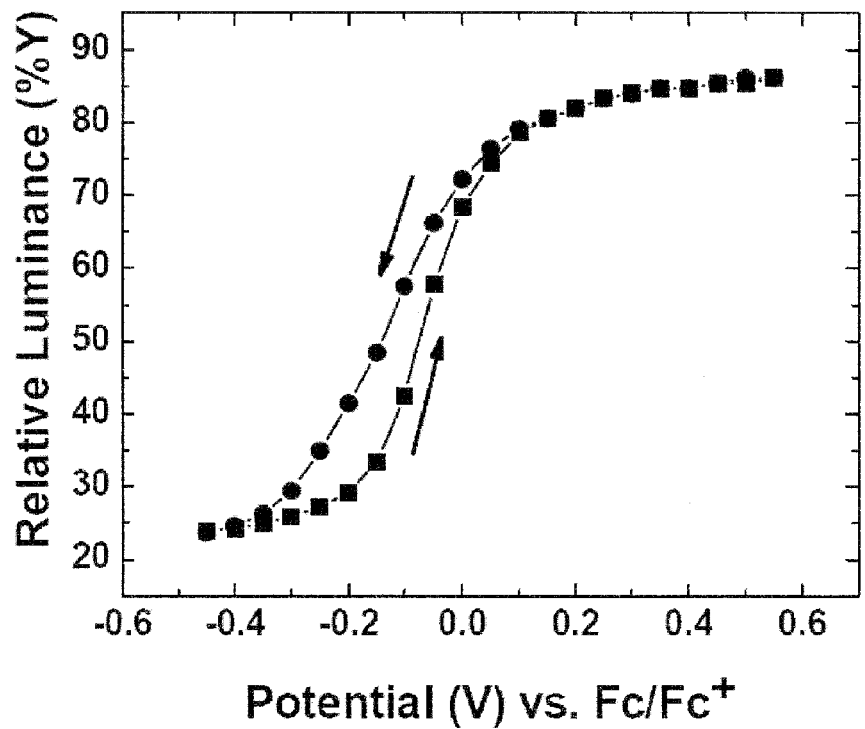
FIG. 18 shows a plot of the relative luminance as a function of applied potential of PPropOT-$Hx_2$ in 0.1 M $LiClO_4$ solution on an ITO/glass electrode.

Since color is subject to the response, sensitivity, and perception of the human eye, elaboration on electrochromic properties are best accomplished with an accurate quantitative measure of the color. In situ color coordinates (hue and saturation) and relative luminance (the amount of light transmitted through the polymer film) values were recorded for each polymer film separately (FIGS. 16, 17, and 18). Considering the three polymer films in their fully reduced forms, PEDOT has a* and b* values of −5 and −37, respectively, giving it a dark blue color with a relative luminance of 32%, PPropOP has a* and b* values of 31 and 75, respectively, giving it an orange color with a relative luminance of 50%, and PPropOT-Hx$_2$ has a* and b* values of 14 and −45 giving it a purple color with a relative luminance of 24%. Note, there is variability in the measured L*, a*, and b* values measured as a function of subtle changes in film thickness and applied potential. When the films are completely oxidized they are all observed as highly transmissive and sky-blue colored films. PEDOT exhibits a* and b* values of −2 and −4, respectively, with a relative luminance of 82%, PPropOP exhibits a* and b* values of −3 and −6, respectively, with a relative luminance of 57%, and PPropOT-Hx$_2$ exhibits a* and b* values of −2 and −4, respectively, with a relative luminance of 86%, demonstrating the cathodic coloration properties of each of these polymers. As shown by the luminance change in FIG. 18, PPropOT-Hx$_2$ possesses the highest contrast ratio in the visible region of the three polymers, having Δ%Y of 62% while PEDOT and PPropOP have 50% and 10-20% (from fully neutral to the oxidized form), respectively. The reduced contrast of PEDOT relative to PPropOT-Hx$_2$ is due to the strong NIR absorption that is found in the oxidized form of PEDOT providing a visible light absorption tail in the red region of the spectrum, which is lower in intensity for the substituted PPropOTs. The simple loss of absorption in the visible region for the thiophene derivatives upon oxidation is seen to be more complicated in PPropOP. As the polymer has a higher band gap, the neutral form is more transmissive to visible light than either of the thiophene derivatives. The initial formation of a polaron during oxidation gives an absorption in the visible region, which results in an initial loss of luminance (FIG. 17). This polaron absorption is subsequently bleached upon full oxidation and a highly transmissive (% Y~60%), light gray state is ultimately reached. Luminance changes with applied potential play a strong role in the electrochromic response of the dual film systems.

PPropOP/PEDOT and PPropOP/PPropOT-Hx$_2$ Dual Systems

Figure 19:
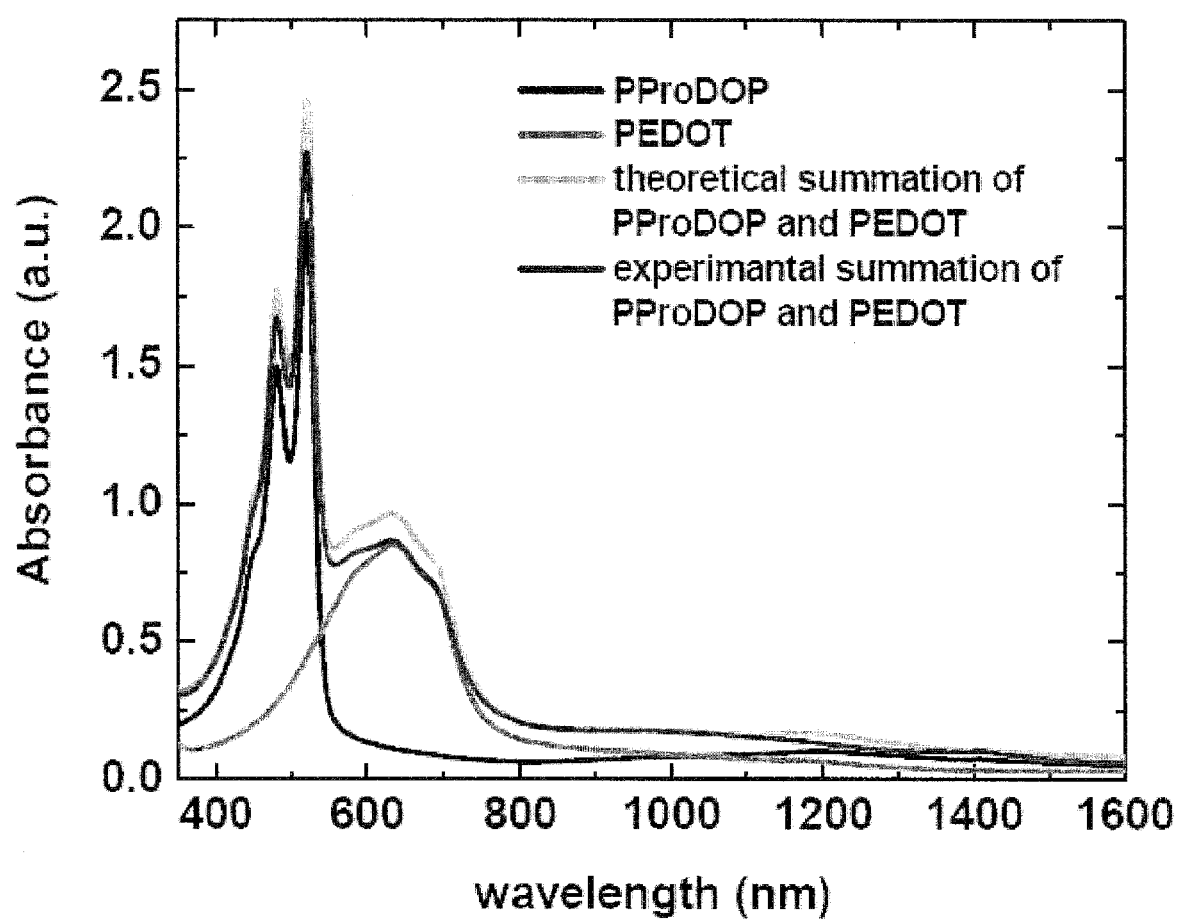
FIG. 19 shows composite UV-vis-NIR spectra of PPropOP/PEDOT for individual polymers and the calculated and recorded spectra for the dual-polymer electrochromic setup in reduced states in 0.1 M $LiClO_4/PC$ solution on ITO/glass electrodes.
Figure 20:
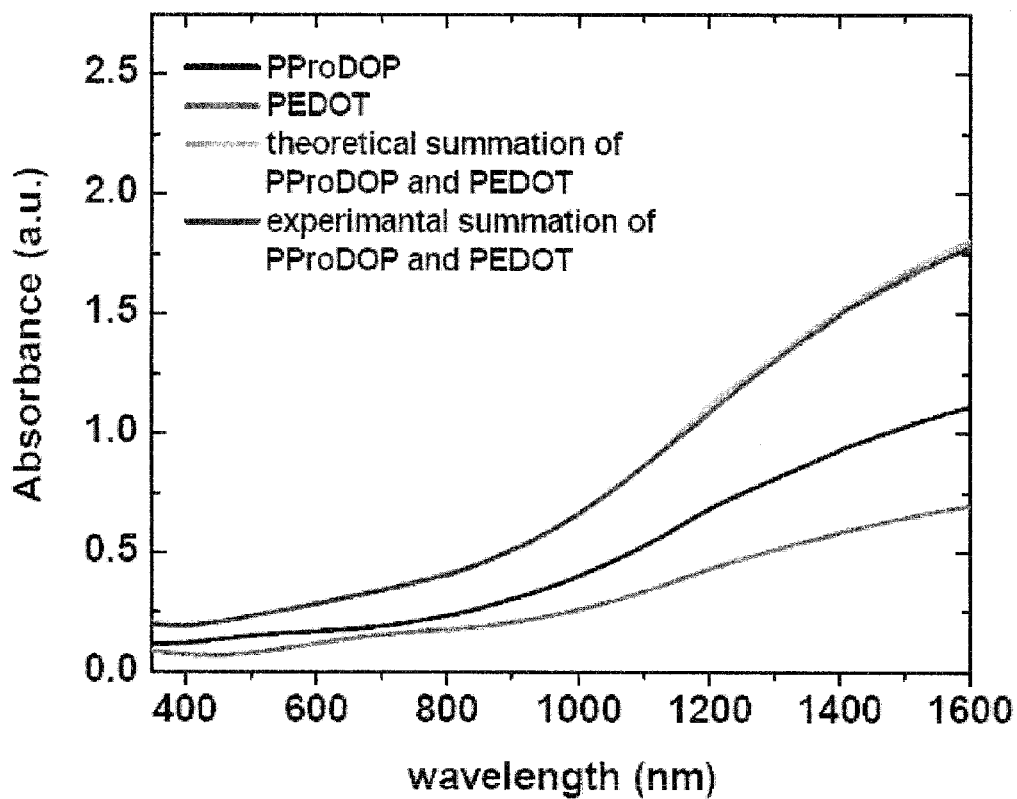
FIG. 20 shows composite UV-vis-NIR spectra of PPropOP/PEDOT for individual polymers and the calculated and recorded spectra for the dual-polymer electrochromic setup in oxidized states in 0.1 M LiClO$_4$/PC solution on ITO/glass electrodes.

Two ITO working electrodes with different electrochromic polymer films were prepared in a similar manner to the films used for spectroeletrochemical and colorimetric characterizations. Both ITO electrodes having two different polymer films and under separate potentiostatic control were placed back to back in a 1 cm quartz cell with a Ag wire as a reference electrode and a Pt wire as a counter electrode. ITO-coated glass slides were used as the working electrodes. In situ color coordinates and electromagnetic spectra in the visible region were recorded from the dual-polymer system upon application of different potentials to different working electrodes in a 0.1 M LiClO$_4$/PC solution. Absorbance spectra of PEDOT and PPropOP films, were taken separately at their reduced (both at −1.35 V vs. Fc/Fc$^+$) and oxidized (PEDOT at +0.45 V and PPropOP at −0.05 V vs. Fc/Fc$^+$) states. These spectra were summed in order to attain a perspective of the combination of the optical response expected from the dual-film electrochromic method to compare with the direct spectral response for the combined films. These spectra are given in FIGS. 19 and 20. The summed and experimentally recorded spectra for the combined films overlay one another almost completely for the oxidized films, and are quite similar for the reduced films. The color transmitted through the stacked films thus appears completely different from the component films. The experimental summation spectrum proves that the dual system enables the physical addition of the optical properties of two different polymer systems, giving the perception of new colors, which are the mixtures from each polymer. Two dual-film systems were studied colorimetrically from the three polymer films employed. The color palettes in Table 1 and Table 2, above, show the L*a*b* color coordinates as a function of the separate potential applied to each film. These color palettes can be used to tune in the accessible colors from a dual-film electrochromic device. For example, as shown in Table 1, above, when PPropOP is reduced and held at its orange state, sequentially oxidizing PEDOT increases the luminance of the dual-film system from 59 to 68 as PEDOT is converted from a dark blue to a transmissive film. Along this sequence, the orange color dominates as the film retains an orange/brown hue. By holding PEDOT in the deep blue neutral state while sequentially oxidizing the PPropOP, a more distinct visual response is observed with the brown/orange film changing to a green-tinted gray. Full oxidation of both films yields a transmissive film with a very light gray hue. The color changes are even more distinct in the PPropOP/PPropOT-Hx$_2$ couple seen in Table 2, above. When the PPropOP film is held in a reduced state while oxidizing the PPropOT-Hx$_2$ film the luminance value increases from 56 to 72 due to the PPropOT-Hx$_2$ converting from dark purple to transmissive blue and resulting in a distinct reddish/purple to orange color change in the dual-film system. As the PPropOP is oxidized and the PPropOT-Hx$_2$ was held in a reduced state, the conversion to a blue state was observed as the PPropOP becomes highly transmissive. Finally the highest luminance is observed when both films are oxidized. The color observed and thus the color coordinates read from the dual-polymer set-up for the coupled polymer films were different than the data collected from these polymers when they were studied separately. For example: coupling PEDOT and PPropOP films in their neutral states resulted in a new color red/brown (L*=59 a*=25 b*=50) which is totally different than the original colors these polymers show at their neutral states, dark blue (L=64* a*=−5 b*=−38) and orange (L*=76 a*=31 b*=75), respectively.

SprayDOT™-Purple 101, SprayDOT™-Green 145, PPropOP-N-EtCN

Film Deposition

In order to obtain thin films of the electrochromic polymers for electrochemical and optical studies, SprayDOT™-Purple 101 and SprayDOT™-Green 145 were drop-cast on Pt-button electrodes or spray-cast on ITO coated glass electrodes from 2 mg/mL polymer/toluene solutions after being filtered through 0.45 μm PTFE filters. SprayDOT™-Purple 101 and SprayDOT™-Green 145 films sprayed on ITO/glass were dried under vacuum overnight.

Poly(3,4-propylenedioxythiophene-N-propionitrile) (PPropOP-N-EtCN) was electro-deposited on Pt-button electrodes or ITO coated glass electrodes by potential scanning. PPropOP-N-EtCN films did not adhere strongly to ITO/glass. To stabilize the PPropOP-N-EtCN on the transparent electrode, films were heated at 55° C. under vacuum for 30 minutes.

Tandem Chronocoulometry and Chronoabsorptometry

Polymer films with similar switching times and giving the highest contrast ratios were chosen for application of the dual-film technique. A tandem chronoabsorptometry/chronocoulometry experiment was used to calculate composite coloration efficiencies and switch times at 95% of the total optical change (% T) at $\lambda_{max}$. The effect of film thickness on coloration efficiency and switch time is tabulated in Table 4. Since SprayDOT™-Green 145's enhanced electrochromism is not limited to a single wavelength, the coloration efficiency was calculated at both $\lambda_{max}$. CE values of SprayDOT™-Purple 101 are higher than SprayDOT™-Green 145's CE values. The bulkier structure of SprayDOT™-Green 145 holds more charge than SprayDOT™-Purple 101 and has a lower optical contrast due to the enhanced tailing of the NIR absorption in to the red absorbing region in the conductive state.

The SprayDOT™-Purple 101 film with a thickness of 500 nm has a charge density of 1.1 mC/cm$^2$ with a change in % T of 52% resulting in a CE of 707 cm$^2$/C at $\lambda_{max}$ of 574 nm, whereas, the thinner SprayDOT™-Green 145 film (380 nm thick) has a charge density of 1.8 mC/cm$^2$ with a change in %

T of 48% resulting in a CE of 299 cm²/C at $\lambda_{max}$ of 465 nm and a change in % T of 39% resulting in a CE of 430 cm²/C at $\lambda_{max}$ of 707 nm. Since PPropOP derivatives (PPropOP-N-EtCN) and poly(2,2,6,6-tetramethylpiperidinyloxy-4-yl methacrylate) (PTMA) have unsaturated pastel colors or no colors, the optical properties of the dual or multi-electrochromic systems are dominated by the saturated colors of cathodically coloring polymers such as PPropOT derivatives.

Figure 23:
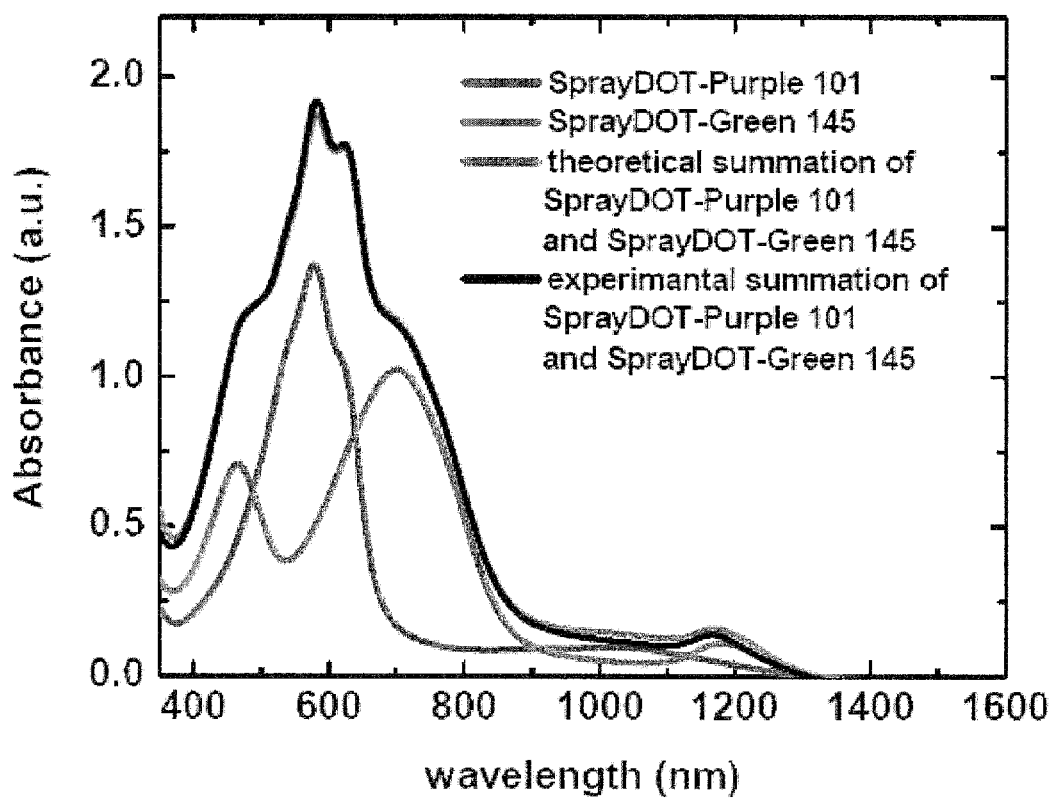
FIG. 23 UV-vis-NIR spectra of SprayDOT™-Purple 101/ SprayDOT™-Green 145 from dual-polymer electrochromic setup at a reduced state in 0.1 M TBAP/PC solution on ITO/ glass electrodes.
Figure 24:
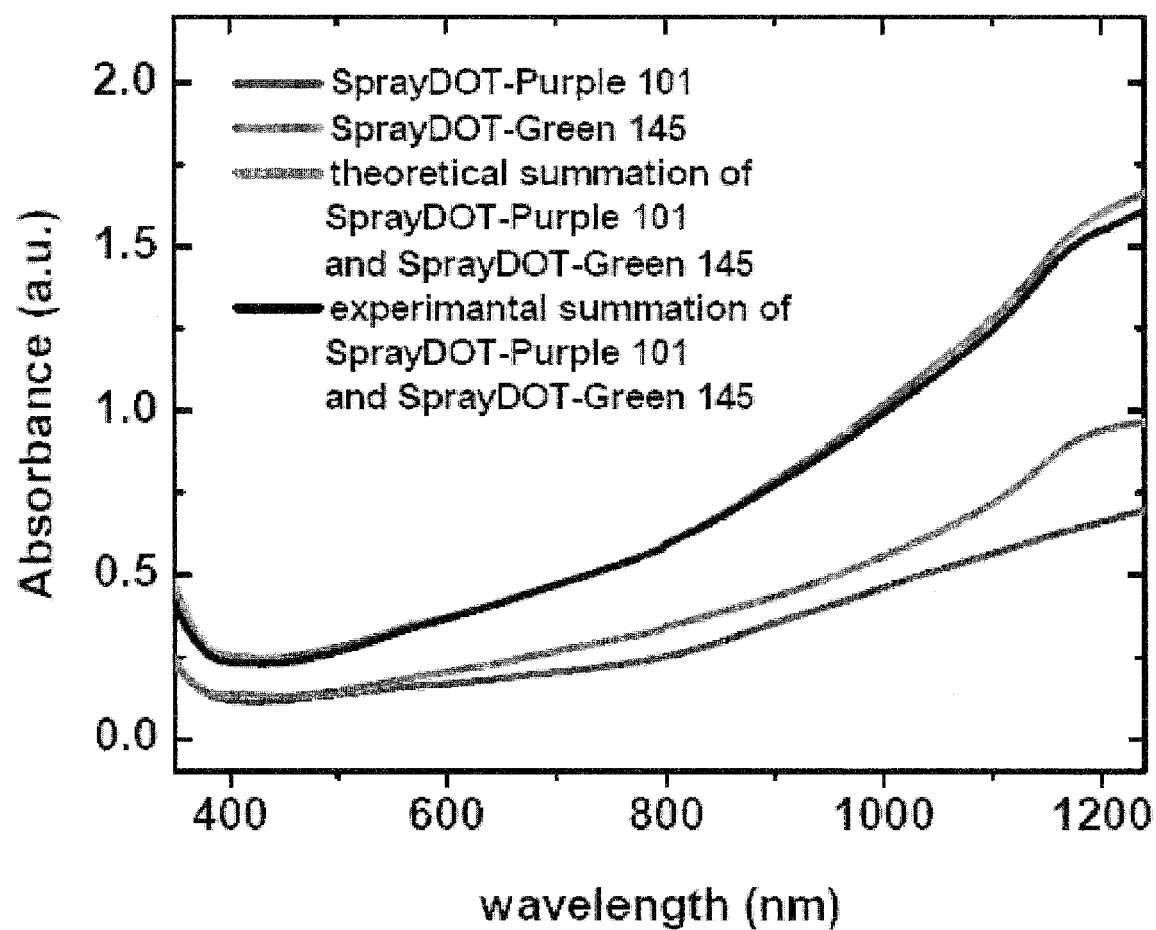
FIG. 24 UV-vis-NIR spectra of SprayDOT™-Purple 101/ SprayDOT™-Green 145 from dual-polymer electrochromic setup at an oxidized state in 0.1 M TBAP/PC solution on ITO/glass electrodes.

Switch times are regulated by the diffusion of the counterions through the films during redox switching. Enhanced optical response times (in seconds) were observed in these systems since the open morphology of the polymer (bulky structures) promotes the mobility of charge compensating counterions. The switch times strongly depend on the thickness of the films, thus thinner films bleach in subseconds while the thicker ones bleach in longer times, as given in Table 4, below. Unlike the switch times, the coloration efficiency is independent of film thickness for these systems. This behavior is attributed to the compensation of the increase in change in optical density, ΔOD, by the increase in charge density.

at −0.66 V vs. Fc/Fc⁺, FIG. 23, and oxidized at +0.74 V vs. Fc/Fc⁺, FIG. 24. The spectra in FIGS. 23 and 24 also give the summation of the individual absorptions and the spectra recorded for the combined dual-electrochromic films which overlay each other.

The dual-film system was studied colorimetrically. The L*a*b color coordinates as a function of the separate potential applied to each film are shown in Table 3, above. The maximum contrast obtained from SprayDOT™-Purple 101 is 0.8, while this value is only 0.5 for SprayDOT™-Green 145. Therefore, SprayDOT™-Purple 101, with a thickness of 605 nm (A=1.30), switching from deep purple (L*=41, a*=22, b*=−48, Q=67) to highly transmissive sky blue (L*=87, a*=−2, b*=−7, Q=87) upon doping with C=0.71 and ΔE=66, and SprayDOT™-Green 145, with a thickness of 360 nm (A=1.10), switching from deep green (L*=60, a*=−23, b*=12, Q=65) to highly transmissive sky blue (L*=84, a*=−4, b*=−6, Q=84) open doping with C=0.40 and ΔE=36, were used for the data of Table 3, above.

The new color palette we established extends from deep blue-black (L*=21, a*=3, b*=−28, Q=35) to clear (L*=75,

TABLE 4

Coloration efficiencies and switch times of SprayDOT ™-Purple 101 and SprayDOT ™-Green 145 at various film thicknesses in 0.1 M TBAP/PC.

| | SprayDOT ™-Green 145 | | | | | SprayDOT ™-Purple 101 | | | |
|---|---|---|---|---|---|---|---|---|---|
| Absorb | Thick nm | CE 465 nm cm²/C | t0.95 sec | CE 707 nm cm²/C | t0.95 sec | Absorb | Thick nm | CE 574 nm cm²/C | t0.95 sec |
| 0.42 | 180 | 333 | 1.2 | 485 | 0.4 | 0.19 | 190 | 651 | 1 |
| 0.59 | 220 | 291 | 2.3 | 317 | 1.3 | 0.64 | 360 | 758 | 2 |
| 0.84 | 290 | 284 | 1.5 | 414 | 1.2 | 0.93 | 470 | 692 | 1.4 |
| 1.17 | 380 | 299 | 1 | 430 | 1.2 | 1.03 | 500 | 707 | 2.2 |
| 1.68 | 520 | 237 | 2.1 | 568 | 1.8 | 1.4 | 640 | 855 | 1.6 |
| 1.82 | 560 | 296 | 2.1 | 428 | 2.3 | 1.79 | 790 | 780 | 2.9 |

Values are reported at 95% of full switch.

Thicknesses

Figure 21:
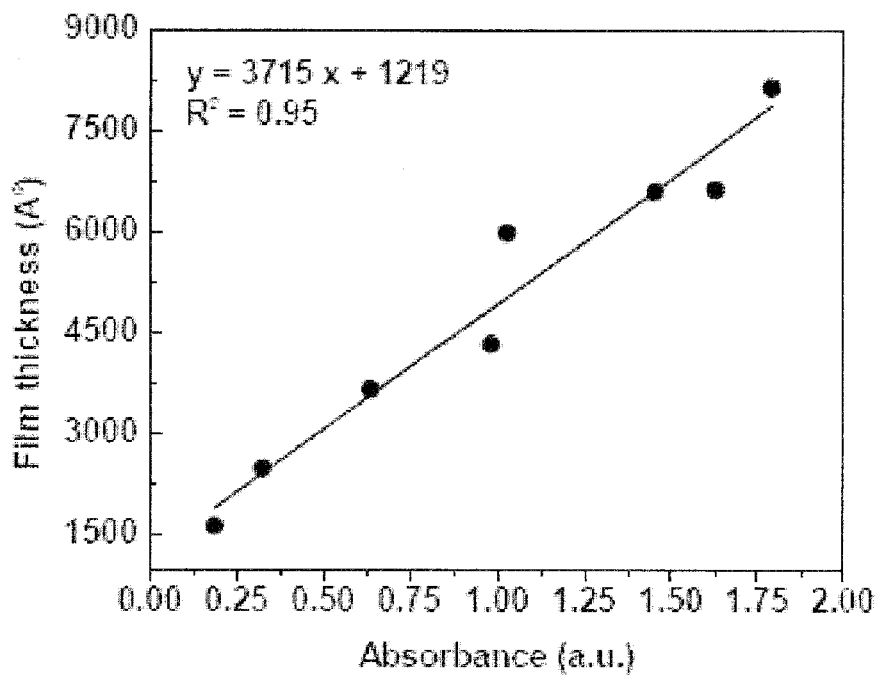
FIG. 21 is a plot of absorbance on ITO/glass (at $\lambda_{max}$=574 nm) vs. film thickness with the linear fit for SprayDOT™-Purple 101.
Figure 22:
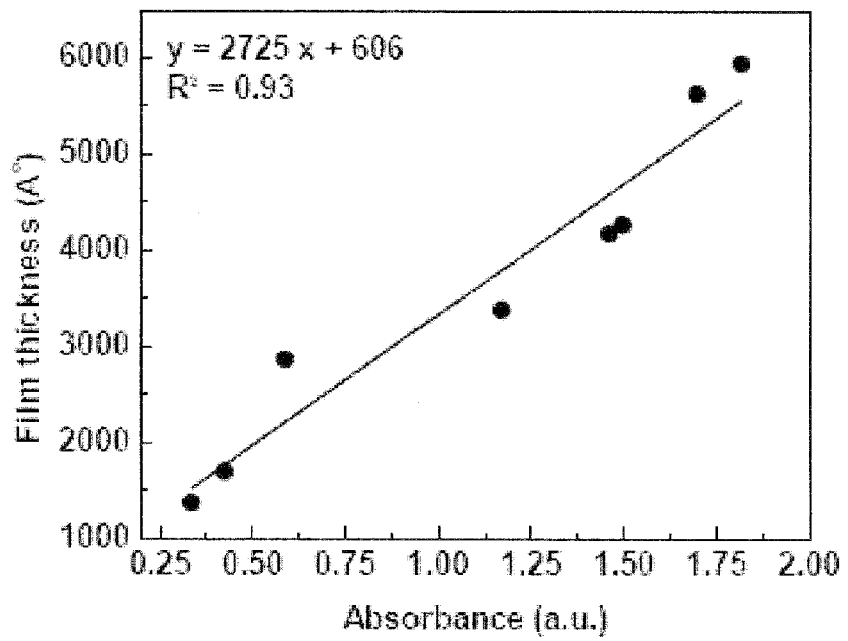
FIG. 22 is a plot of absorbance on ITO/glass (at $\lambda_{max}$=707 nm) vs. film thickness with the linear fit for SprayDOT™-Green 145.

Absorbance vs. thickness calibration plots were generated, where eight films of both SprayDOT™-Purple 101 and SprayDOT™-Green 145 were sprayed on ITO/glass. Each film had a different absorbance value ranging from 0 to 2 (at $\lambda_{max}$). The film thicknesses were measured by a profilometer after each film was conditioned by potential stepping between its reduced and oxidized states. Five measurements were made on each film and the averages of these data were used. In each case, the thickness scaled linearly with absorbance as shown in FIGS. 21 and 22 for SprayDOT™-Purple 101 and SprayDOT™-Green 145, respectively.

Dual-Film Electrochromic System

The dual electrochromic-film characterization method was used to predict the colors that could be generated by multi-electrode devices whose working principles are based on color mixing. SprayDOT™-Green 145 and SprayDOT™-Purple 101 on ITO electrodes, under separate potentiostatic control, were placed back to back in a 1 cm quartz cell to serve as working electrodes with a Ag wire as a reference electrode and a Pt wire as a counter electrode. In situ color coordinates and electromagnetic spectra in the visible region were recorded from the dual polymer system upon application of different potentials to different working electrodes in a 0.1 M TBAP/PC electrolyte.

In order to get an insight of the addition of optical properties by means of the dual-film electrochromic device, absorbance spectra of SprayDOT™-Purple 101 and SprayDOT™-Green 145 films, were recorded separately for films reduced a*=−6, b*=−12, Q=76) and embodies all tones of mixtures of green and purple. The luminance contrast for this color gamut is 0.90 and the color contrast is 69. By having two colors mixed and absorbance extended along the full visible range (formation of black), hindrance to contrast due to the chroma is eliminated to noticeable extent.

SprayDOT™-Purple 101/SprayDOT™-Green 45/PPropOP-N-EtCN

SprayDOT™-Green 145, SprayDOT™-Purple 101 and PPropOP-N-EtCN films on ITO electrodes were prepared as described before. PPropOP-N-EtCN, non-color changing counter electrode polymer, was electropolymerized on to ITO-coated glass slides and heated. The thicknesses of the non-color changing PPropOP-N-EtCN films on the counter electrodes were set to ensure the charge balance with the polymer it was facing and to retain high transmissivity. After 10 potential scans, a highly transparent polymer film, which has the capability to balance charges, was obtained. Further scans result in thicker films with less transmissivity. PPropOP-N-EtCN films were dried at 55° C. under vacuum for 30 minutes. All polymer films were electrochemically conditioned by sweeping the potential. Cathodically coloring SprayDOT™-Green 145 and SprayDOT™-Purple 101 were fully oxidized to their transparent state and non-color changing films of PPropOP-N-EtCN were fully neutralized to improve the charge balance prior to assembling of the device. The assembly continued by coating SprayDOT™-Green 145 and SprayDOT™-Purple 101 films with gel electrolyte and placing the PPropOP-N-EtCN counter electrodes on top of the gel electrolyte. The two devices were connected in series so that the counter electrode of each device is back-to-back and connected with a copper tape to serve as a combined counter electrode to the whole device. The SprayDOT™-Purple 101 serves as a working electrode-1 and the SprayDOT™-Green 145 serves as working electrode 2, as illustrated in FIG. 1. The combined device was encapsulated by paraffin wax and epoxy to allow long-term testing. In situ color coordinates were recorded from the electrochromic device upon application of different potentials to different working electrodes.

Figure 25:
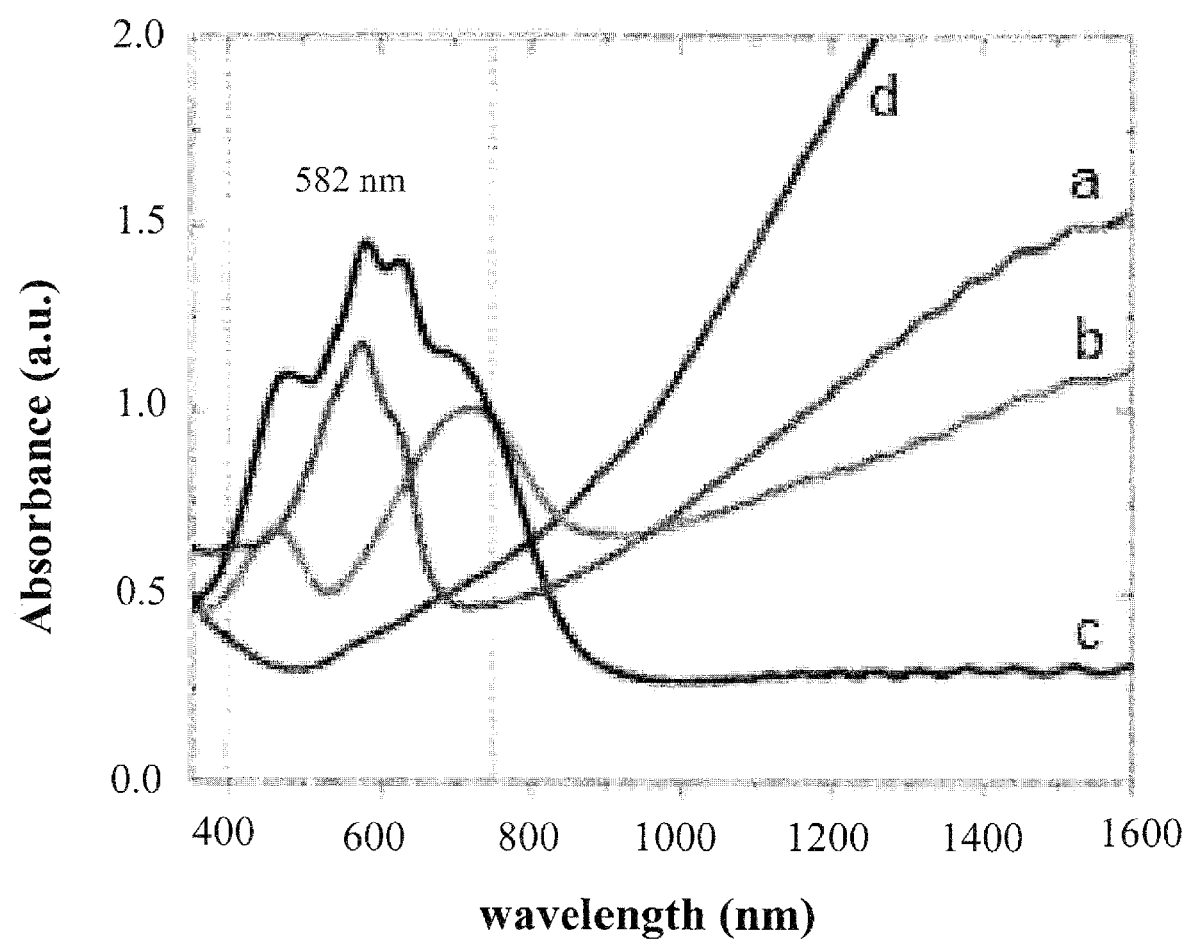
FIG. 25 shows UV-vis-NIR spectra of an electrochromic device according to an embodiment of the invention for: a) only the first working electrode coated with SprayDOT™-Purple 101 in a reduced state; b) only the second working electrode coated with SprayDOT™-Green 145 in a reduced state; c) the combined working electrodes in a reduced state; and d) the combined working electrodes in an oxidized state.

The absorbance spectra and the colorimetric data from the first combined counter electrode electrochromic device are shown in FIG. 25 and Table 5, respectively. When a potential of +1.4 V is applied to both the SprayDOT™-Purple 101 and the SprayDOT™-Green 145 working electrodes, the device becomes highly transmissive (L*=75, a*=−7, b*=−7). When a potential of −0.2 V is applied to both working electrodes, both films become absorptive and the device appears blue-black absorbing along the full visible region (L*=26, a*=−3, b*=−17) with a $\lambda_{max}$ of 582 nm. When a potential of −0.2 V is applied to the SprayDOT™-Purple 101 working electrode and a potential of +1.4 V is applied to the SprayDOT™-Green 145 working electrode, the device appears deep purple (L*=56, a*=7, b*=−15). When a potential of +1.4 V is applied to SprayDOT™-Purple 101 working electrode and a potential of −0.2 V is applied to the SprayDOT™-Green 145 working electrode, the device appears deep green (L*=57, a*=−17, b*=4). The electrochromic device shows a luminance contrast of 0.82 and a color contrast of 50.

TABLE 5

L*a*b* color coordinates for a SprayDOT ™-Purple 101/SprayDOT ™-Green 145 electrochromic display with a combined counter electrode with PProDOP-N-EtCN.

| Green 145 | L* = 60 | L* = 84 |
|---|---|---|
|  | a* = −23 | a* = −4 |
| Purple 101 | b* = 12 | b* = −6 |
| L* = 41 | L* = 26 | L* = 56 |
| a* = 22 | a* = −3 | a* = 7 |
| b* = −48 | b* = 17 | b* = −15 |
| L* = 87 | L* = 57 | L* = 75 |
| a* = −2 | a* = −17 | a* = −7 |
| b* = −7 | b* = 4 | b* = −7 |

The electrochromic device has a reasonable contrast value between the darkest and the lightest states and improves on other devices used in information display technology by offering a full color palette. Additionally, the device shows a reasonable optical stability. The electrochromic device was potential stepped between its darkest and brightest states. Values of % T were recorded at 582 nm over time with two computer controlled potentiostats used as an equivalent of a bipotentiostat for long term studies. The electrochromic device retained 50% of its optical contrast after 1000 deep potential cycles. The counter electrode material PPropOP-N-EtCN with and oxidation onset of −0.15 V vs. Fc/Fc+ is stable in air, but was the component most prone to oxidation. The oxidation of counter electrode material diminishes the charge compensation that is critical for device function. Sealing of the device from $O_2$ penetration can permit longer switch times.

SprayDOT-Purple 101/SprayDOT-Green 145/PTMA

Figure 26:
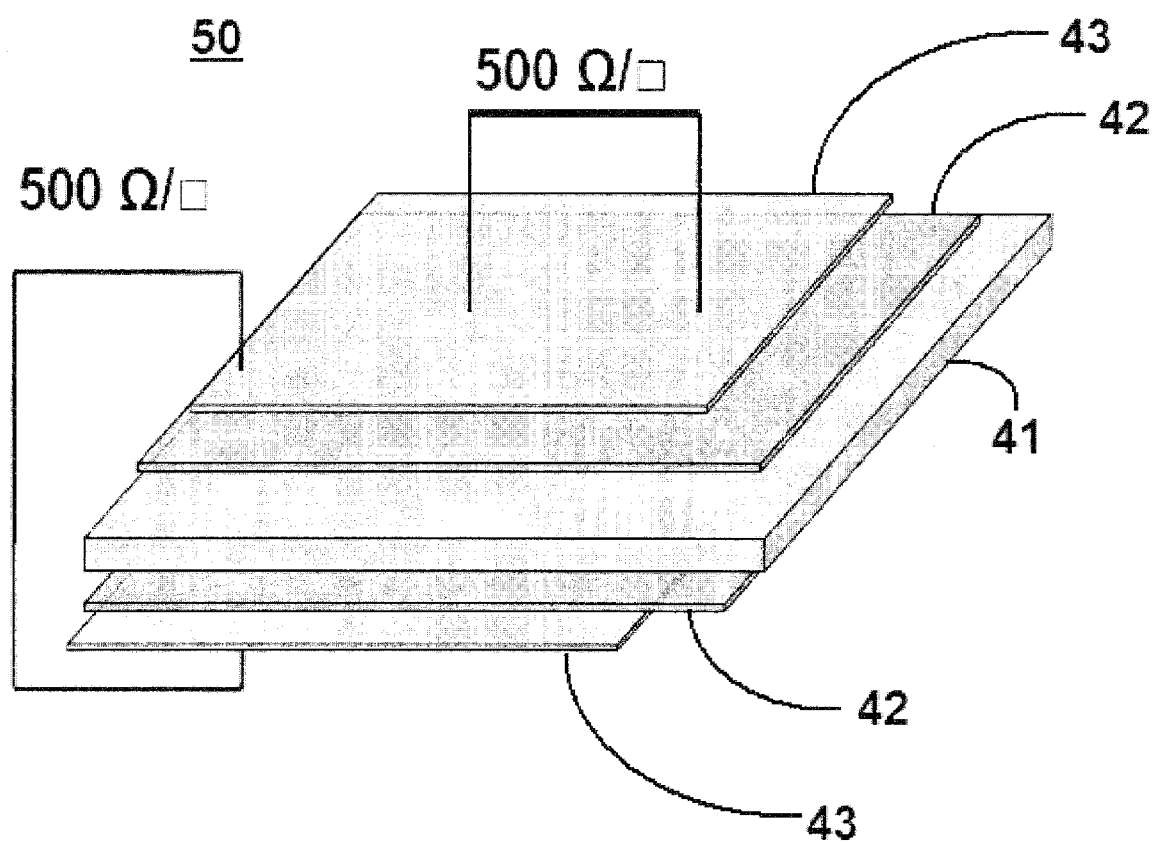
FIG. 26 is a schematic diagram of a highly transmissive porous electrode (PETE/Au/PEDOT:PSS).

A counter electrode 50 was constructed that is schematically shown in FIG. 26, has three components, polyester membrane 41, PEDOT:PSS 42, and gold 43. The track-etched polyester membrane 41 (10 micron pore diameter). PETE, serves as the porous support. A highly conducting PEDOT:PSS formulation was spin-coated on both sides of the membrane at 3000 rpm for 30 sec., and the films 42 were dried under vacuum at 120° C. for 2 hours. Evaporation of 1.5 nm of Au 43 on the PETE 41 with a single layer of PEDOT:PSS 42 on each side decreased the surface resistance from 1000Ω/□ to 500Ω/□. The resistance through the film also decreased from 1100Ω/□ to 500Ω/□ with a transmissivity of 55%.

The transmissive porous electrode, PETE/PEDOT:PSS/Au 50 was coated with an electroactive polymer layer that does not change color yet undergoes an electrochemical redox reaction and acts to balance charge during switching. A nitroxide radical polymer, PTMA, a polymethacrylate derivative with a 2,2,6,6-tetramethyl-1-piperidinyloxy, TEMPO, stable free-radical in the repeat unit was used as the electroactive polymer. The PTMA is a charge storage material on the counter electrode. The PTMA was blended with a high molecular weight polymethylmethacrylate PMMA in a 1:4 weight ratio (15 mg PTMA/60 mg PMMA/60 mL toluene) and on the counter electrode to supply charge and stability to devices without limiting the contrast.

SprayDOT™-Green 145 and SprayDOT™-Purple 101 were spray cast onto ITO electrodes and dried under vacuum. A layer of PTMA solution was sprayed on to the PETE/PEDOT:PSS/Au electrode 50, and then several layers of PTMA/PMMA blend solution were sprayed onto the electrode until a film becomes opaque, which subsequently clarified when the electrode was inserted in a solution. The electrode was annealed in vacuum oven for an hour at 90° C. Cathodically coloring SprayDOT™-Green 145 and SprayDOT™-Purple 101 were fully oxidized and non-color changing PTMA/PMMA blend film was fully neutralized to improve the charge balance prior to assembling of the device. The SprayDOT™-Green 145 and SprayDOT™-Purple 101 films were then coated with gel electrolyte and the counter electrode was sandwiched between them. The SprayDOT™-Purple 101 serves as a first working electrode and the SprayDOT™-Green 145 serves as a second working electrode and the device was encapsulated by paraffin wax. In situ color coordinates were recorded from the electrochromic device upon application of different potentials to different working electrodes.

Figure 27:
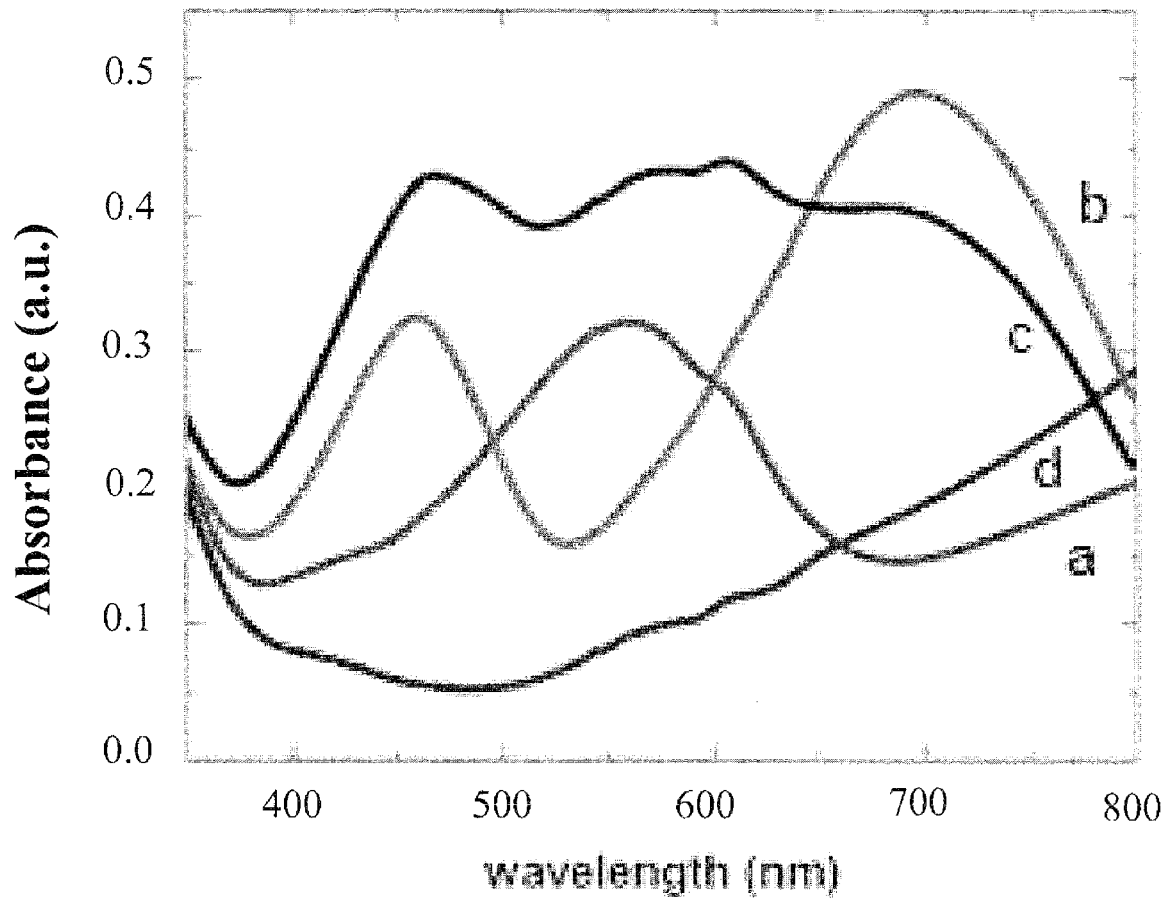
FIG. 27 UV-vis spectra of an electrochromic device according to an embodiment of the invention where: a) only the first working electrode coated with SprayDOT™-Purple 101 is reduced; b) only the second working electrode coated with SprayDOT™-Green 145 is reduced; c) both of the working electrodes are reduced; and d) both working electrodes oxidized with little absorbance over the visible region.

The absorbance spectra and the colorimetric data obtained from the electrochromic device are shown in FIG. 27 and Table 6, below. UV-vis-NIR spectra from a SprayDOT™-Purple 101/SprayDOT™-Green 145 electrochromic device shows a broad absorption with a $\lambda_{max}$ of 608 nm over the entire visible range upon reduction of both electrochromic polymers of the working electrodes. The device becomes clear and transmissive upon doping of the electrochromic layers. When a potential of 1.5 V is applied to both working electrodes (SprayDOT™-Purple 101 and SprayDOT™-Green 145), the films become transmissive (L*=62, a*=0, b*=−1) and when a potential of −0.5 V is applied to both working electrodes, both films become absorptive and the device appears blue-black, absorbing throughout the visible region (L*=25, a*=7, b*=−1). When a potential of −0.5 V is applied to SprayDOT™-Purple 101 and +1.5 V to SprayDOT™-Green 145, the green film becomes transmissive leaving the purple film in a neutral state and the device appears deep purple (L*=35, a*=21, b*=−38). When a potential of +1.5 V is applied to the first working electrode, SprayDOT™-Purple 101, and −0.5 V to the second working electrode, SprayDOT™-Green 145, the green film becomes absorptive and the purple film becomes transmissive leading the device to appear deep green (L*=61, a*=−22, b*=16). The electrochromic device shows a luminance contrast of 0.74 and a color contrast of 43.

TABLE 6

L*a*b* color coordinates from the SprayDOT-Purple 101/SprayDOT-Green 145 electrochromic display with a counter electrode with PTMA.

| Green 145 | L* = 60 | L* = 84 |
| | a* = −23 | a* = −4 |
| | b* = 12 | b* = −6 |
| Purple 101 | L* = 87 | L* = 25 |
| L* = 41 | a* = −2 | a* = 7 |
| a* = 22 | b* = −7 | b* = −21 |
| b* = −48 | L* = 62 | L* = 61 |
| L* = 35 | a* = 0 | a* = −22 |
| a* = 21 | b* = −1 | b* = 16 |
| b* = −38 | | |

RGB Color Space 5-Electrode Electrochromic Device (SprayDOT™-Red 252, SprayDOT™-Green 179, SprayDOT™-Blue 153, PTMA)

Film Deposition

The structures of the polymers: SprayDOT™-Red 252; SprayDOT™-Green 179; and SprayDOT™-Blue 153 are shown below. Thin films of the electrochromic polymers for electrochemical and optical studies were prepared by drop-casting on Pt-button electrodes or spray-cast on ITO coated glass electrodes from 2 mg/mL polymer/toluene solutions after being filtered through 0.45 μm PTFE filters. Spray cast films on ITO/glass were dried under vacuum overnight. Non-color changing, electrochemically active PTMA/PMMA was sprayed and treated on ITO/glass for use in absorptive/transmissive window type electrochromic devices, and on PETE/PEDOT:PSS/Au counter electrodes for use in RBG 5-electrode electrochromic devices.

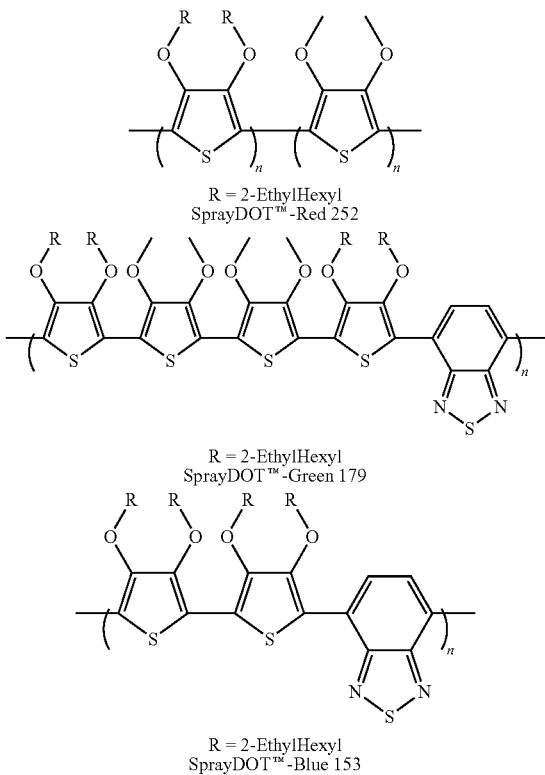

Polymer Cyclic Voltammetry, Scan Rate Dependence

CVs were recorded for each film at scan rates ranging from 25 to 300 mV/s. A linear increase of the current with scan rate was observed for each film, indicating that the electroactive polymer film was adhered to the surface. These polymers completed their redox cycles in narrow potential windows. SprayDOT™-Blue 153 switched between its extreme redox states with a very small potential difference of only 0.5V, which is advantageous for low potential electronic device applications.

Spectroelectrochemistry

Spectroelectrochemical and colorimetric studies were conducted to acquire the optical characteristics of the polymer films in the appropriate potential ranges as determined by the cyclic voltammetry experiments. In their neutral states, SprayDOT™-Red 252 appears red ($\lambda_{max}$ at 528 nm), SprayDOT™-Green 179 appears green ($\lambda_{max}$ at 443 nm and 634 nm) and SprayDOT™-Blue 153 appears blue ($\lambda_{max}$ at 398 nm and 652 nm). Doping of these electrochromic polymer films resulted in highly transmissive films, where charge carrier states emerged with the majority of the light absorption for each polymer occurring in the NIR. A slight absorbance in the visible region on oxidation due to near-IR tailing results in a light blue hue in the transmissive state for the green and blue polymer films.

Tandem Chronocoulometry and Chronoabsorptometry

Tandem chronoabsorptometry/chronocoulometry experiments were performed, from which composite coloration efficiency (CE) values were calculated and switch times were determined for 95% of the total optical change (% T) at $\lambda_{max}$ (t0.95). The SprayDOT™-Red 252 film with an absorbance of 0.9 at $\lambda_{max}$ (528 nm) has a charge density of 1.3 mC/cm² with a 52% Δ% T of resulting in a CE of 545 cm²/C. SprayDOT™-Green 179 film with an absorbance of 1 at 634 nm has a charge density of 2.1 mC/cm² with a 50% Δ% T at 443 nm resulting in a CE of 287 cm²/C and a 41% Δ% T at 634 nm resulting in a CE of 310 cm²/C. SprayDOT™-Blue 153 film with an absorbance of 1.1 at $\lambda_{max}$ (652 nm) has a charge density of 1.7 mC/cm² with a 43% Δ% T resulting in a CE of 442 cm²/C. Switching times, which are dependent on the migration of the counterions through the films during redox switching, were twice the value for SprayDOT™-Red 252 than for SprayDOT™-Green 179 and SprayDOT-Blue 153. All three polymers have solubilizing alkoxy groups along the chains. The BTD units of the SprayDOT-Green 179 (t0.95=2-2.5 s) and SprayDOT-Blue 153 (t0.95=2.2 s) polymers appear to allow faster migration of ions in and out of their polymer matrix, resulting in faster switch times to those of SprayDOT™-Red 252 (t0.95=4.8 s).

Colorimetry

In situ color coordinates and relative luminance values were recorded for each of the three electrochromic polymer films with primary colors in their fully reduced states. SprayDOT™-Red 252 has a* and b* values of 49 and 5, respectively, giving it a red color with a relative luminance of 28%. SprayDOT™-Green 179 has a* and b* values of −15 and −5, respectively, giving it a green color with a relative luminance of 25%. SprayDOT™-Blue 153 has a* and b* values of −21 and −36 giving it a blue color with a relative luminance of 25%. When the films are completely oxidized they all are converted into highly transmissive states. In the oxidized state: SprayDOT™-Red 252 exhibits a* and b* values of −1 and 2, respectively, with a relative luminance of 69%; SprayDOT™-Green 179 a* and b* values of −3 and −8, respectively, with a relative luminance of 64%; and SprayDOT™-Blue 153 exhibits a* and b* values of −4 and −2, respectively, with a relative luminance of 65%.

All three cathodically coloring polymers possess a luminance contrast ratio of C ~0.4 having Δ% Y of ~40% from fully neutral to the oxidized form. Based on the optical studies, films with absorbance values of 1 at $\lambda_{max}$ were used for the exemplary full color device. Thicker films resulted in a lower contrast ratio and thinner films had poorer color saturation. Hysteresis was observed for luminance as a function of applied potential. A lower potential was required for an optical change upon reduction than for change upon oxidation.

Dual Absorptive/Transmissive Window Electrochromic Devices

Dual absorptive/transmissive window type electrochromic devices were constructed. The electrochromic polymers were sprayed onto ITO/glass electrodes and dried under vacuum as given above. A layer of PTMA spray on ITO/glass was followed by a spray of PTMA/PMMA solution until the film become opaque which became transmissive when placed in the electrolyte. Film thicknesses were set to balance the number of redox sites on the cathodically coloring working electrodes and non-color changing film counter electrodes. All the electroactive films were conditioned by potential cycling. Cathodically coloring red, green and blue polymer films were doped (bleached) and PTMA/PMMA films were reduced prior to the device assembly to have an initial charge balance of the electrode couples. The cathodically coloring films of the working electrodes were coated with a TBAP/PC gel electrolyte and sandwiched with ITO/PTMA/PMMA counter electrodes. Devices were encapsulated by paraffin wax. Spectroelectrochemical and colorimetric characteristics were determined for the exemplary window devices.

Figure 28:
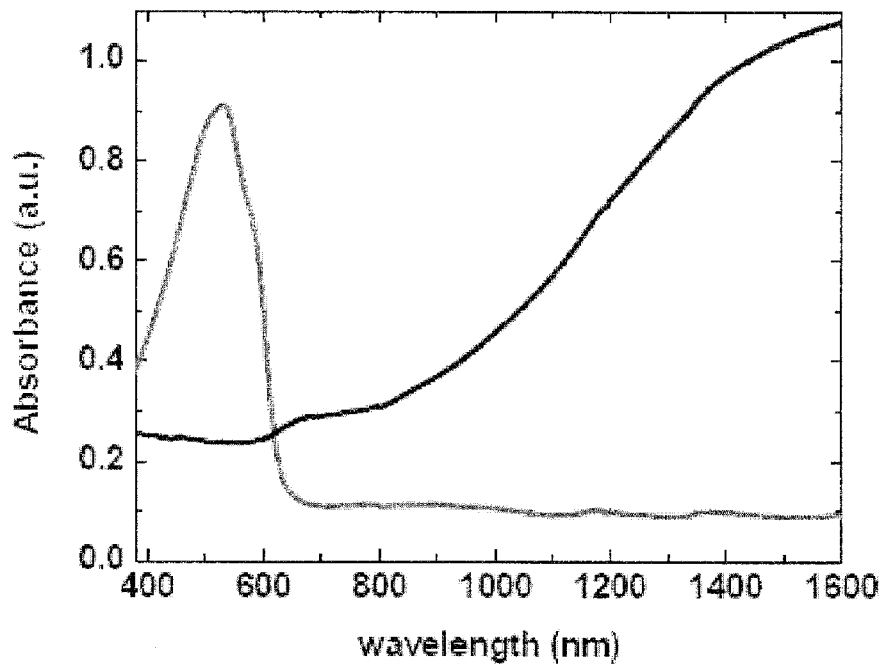
FIG. 28 shows a UV-vis-NIR spectrum for a SprayDOT™-Red 252/PTMA window electrochromic device.
Figure 29:
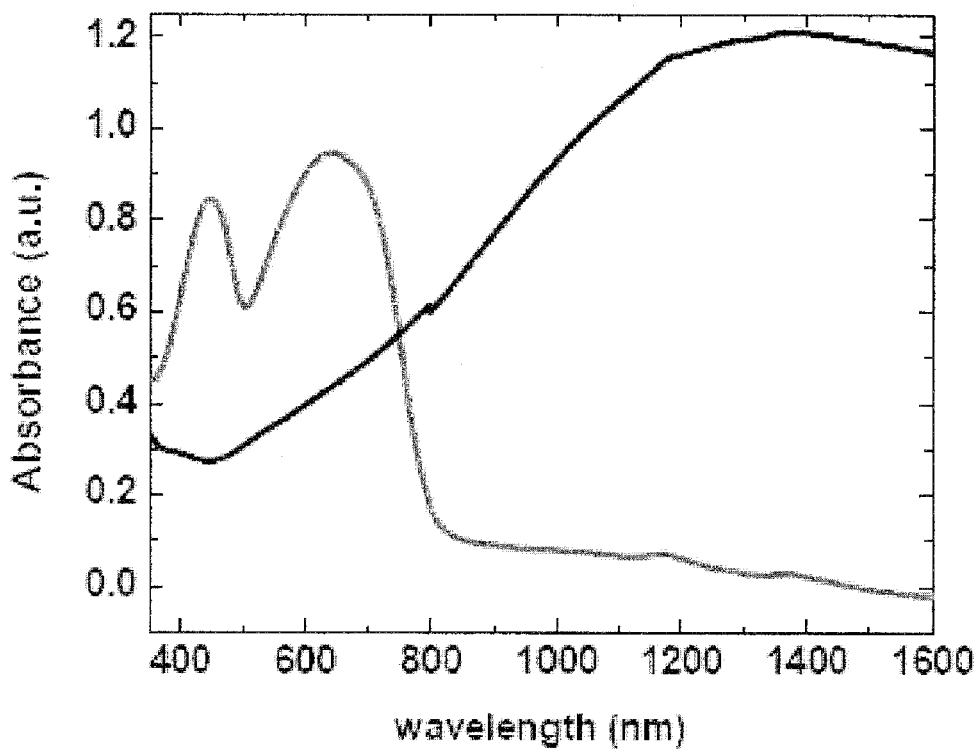
FIG. 29 shows a UV-vis-NIR spectrum for a SprayDOT™-Green 179/PTMA window electrochromic device.
Figure 30:
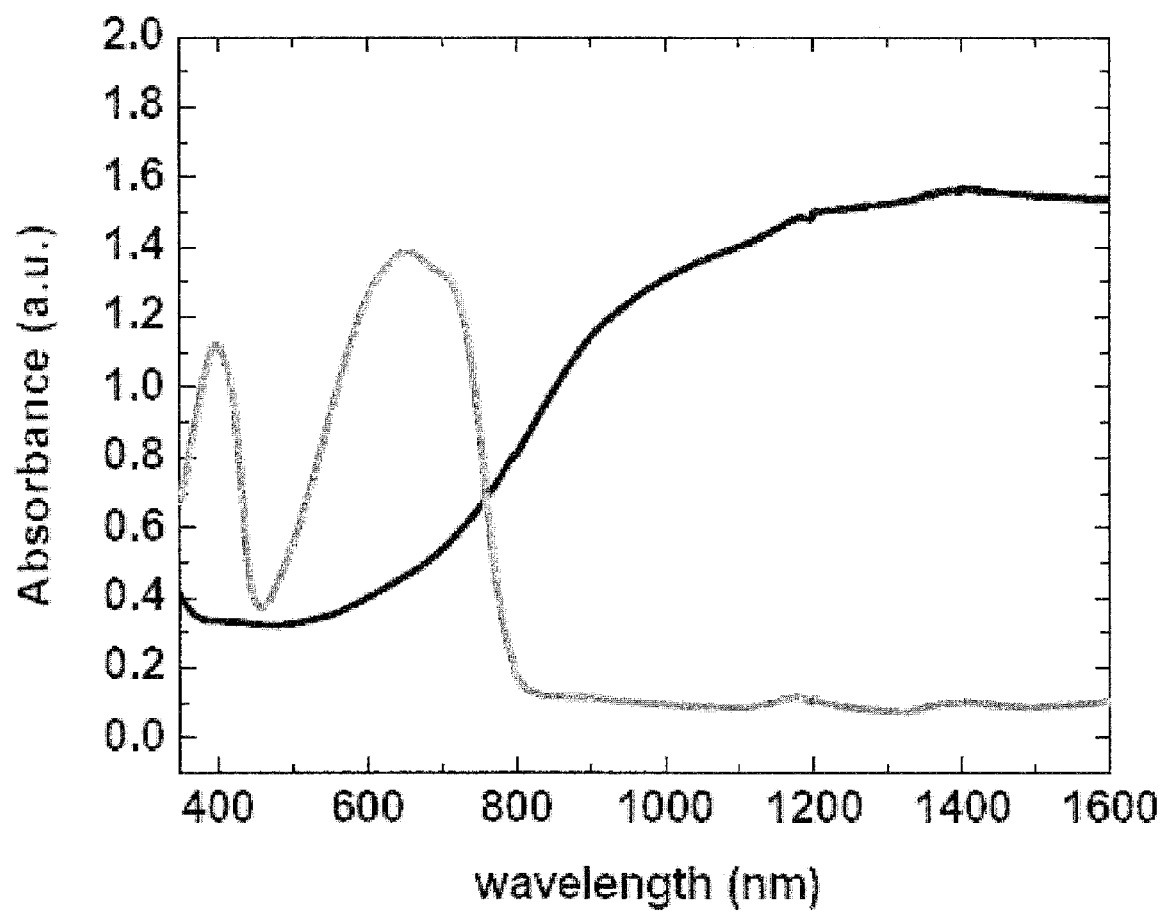
FIG. 30 shows a UV-vis-NIR spectrum for a SprayDOT™-Blue 153/PTMA window electrochromic device.

The spectroelectrochemical data for these Red, Green and Blue windows are shown in FIGS. 28, 29 and 30. When the devices were negatively biased to their colored states, SprayDOT™-Red 252/PTMA device appears red (absorbing mainly at 532 nm) and has L*, a*, b* coordinates of 58, 38, 6, respectively, SprayDOT™-Green 179/PTMA device appears green (absorbing at 443 nm and 643 nm) and has L*, a*, b* coordinates of 45, −13, −1, respectively, and SprayDOT™-Blue 153/PTMA device appears blue (absorbing at 398 nm and 652 nm) and has L*, a*, b* coordinates of 55, −18, −35, respectively. When the bias was reversed, devices switched to their transmissive states. The SprayDOT™-Red 252/PTMA device maintains a yellow hue and has L*, a*, b* coordinates of 81, −2, 3, respectively. The SprayDOT™-Green 179/PTMA device maintains a blue hue and has L*, a*, b* coordinates of 69, −4, −10, respectively. The SprayDOT™-Blue 153/PTMA device maintains a blue hue and has L*, a*, b* coordinates of 80, −3, −5, respectively.

RGB Color Space 5-Electrode Electrochromic Device

Figure 31:
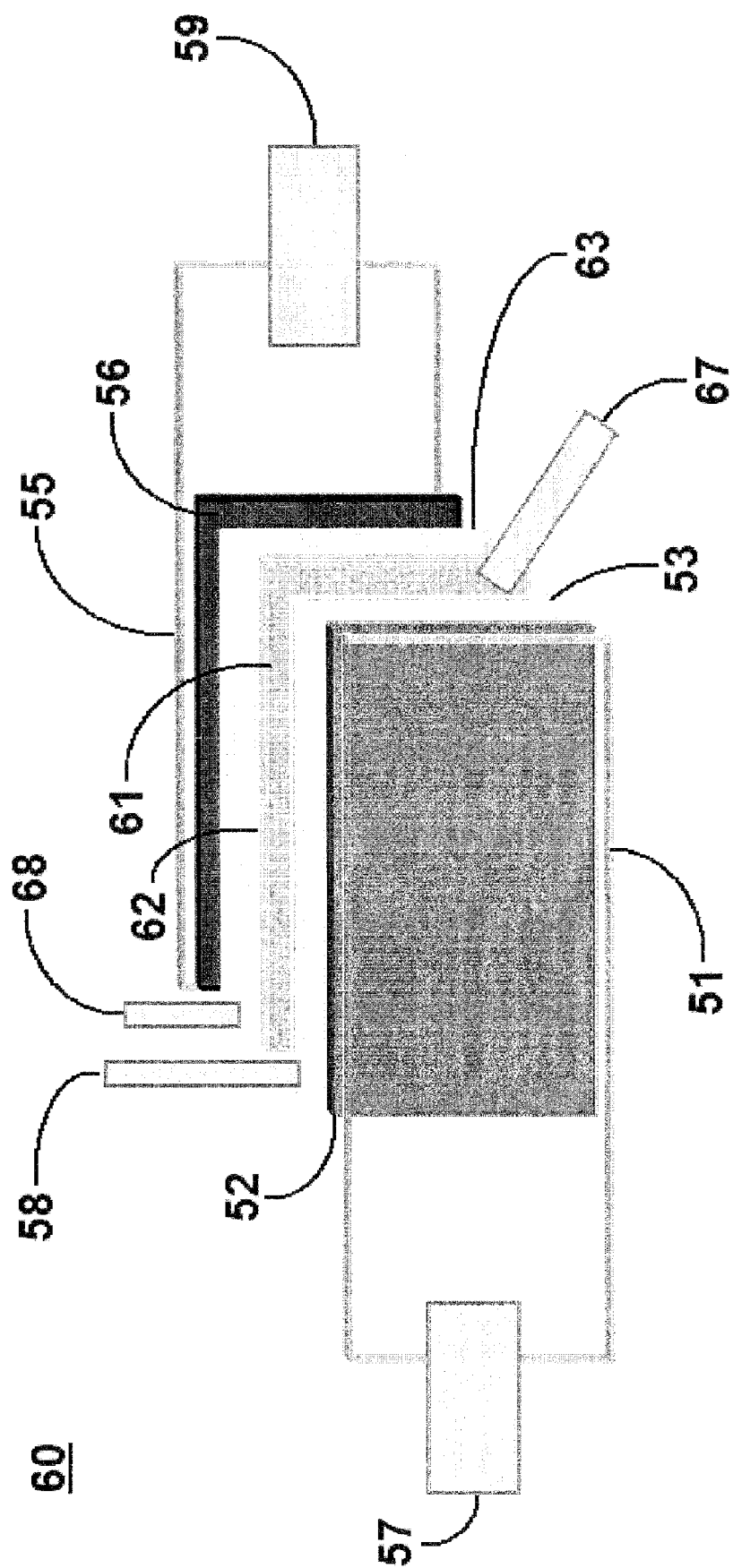
FIG. 31 shows a multi-electrode electrochromic device comprising 5 electrodes according to an embodiment of the invention.

A RGB 5-electrode electrochromic device was constructed with three working electrodes and two counter electrodes whose potentials are controlled separately, as shown in FIG. 31. Electrochromic polymers (56) SprayDOT™-Red 252 and (52) SprayDOT™-Green 179 were sprayed onto ITO/glass materials to form working electrodes 55 and 51, respectively. Electrochromic polymer (62) SprayDOT™-Blue 153 was sprayed on PETE/PEDOT:PSS/Au electrode to form working electrode 61. PTMA/PMMA a non-electrochromic, electroactive, transparent polymer blend, was sprayed on the porous PETE/PEDOT:PSS/Au as disclosed above to form counter electrodes 53 and 63, which were sandwiched between working electrodes 51 and 61 and 55 and 61, respectively. The working and counter electrodes were separated by TBAP/PC gel electrolyte to allow charge transport. The device was encapsulated with a paraffin wax.

Figure 32:
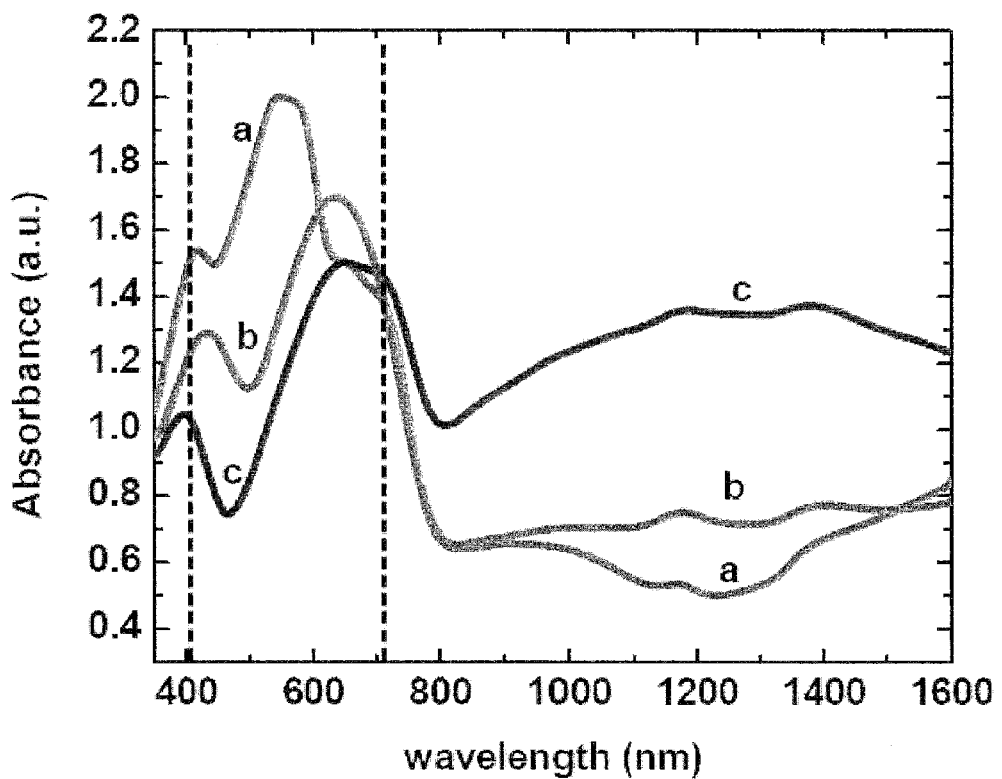
FIG. 32 shows a UV-vis-NIR spectrum for a 5-electrode electrochromic device according to an embodiment of the invention.
Figure 33:
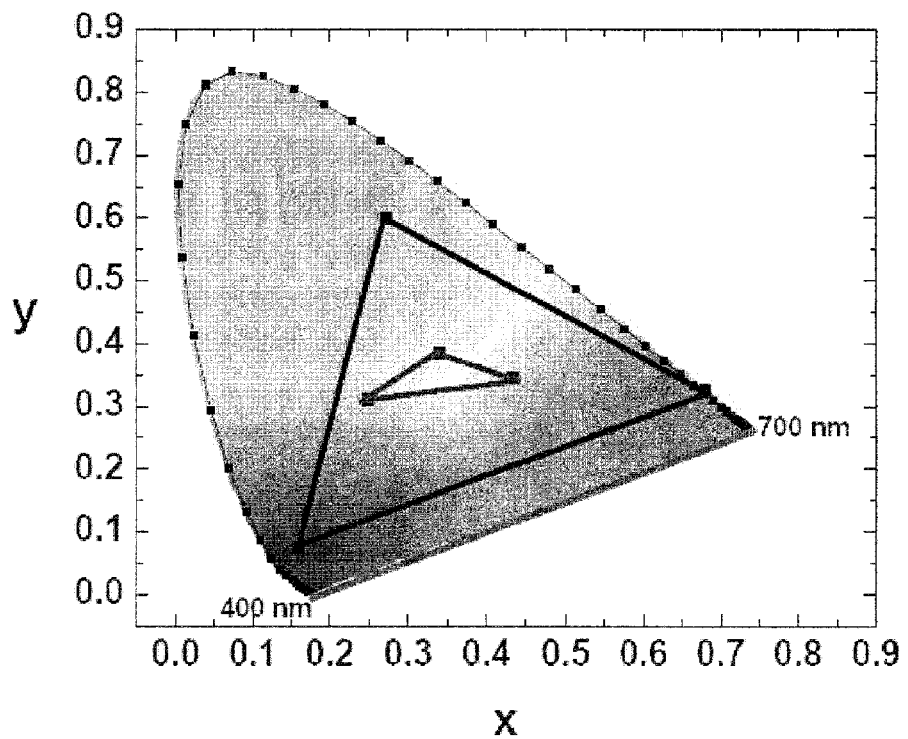
FIG. 33 shows a CIE chromaticity diagram with chromaticity coordinates for an RGB 5-electrochromic device (small triangle) and for CRT phosphors (large triangle).

A potentiostat and a bipotentiostat were used to control the applied potentials to the 5-electrode device, where, for example, electrical contacts 57, 58 and 67 can be connected to the bipotentiostat and electrical contacts 59 and 68 can be connected to the potentiostat. Spectroelectrochemical and colorimetric data were determined for the device as illustrated in FIGS. 32 and 33, respectively. When working electrodes 55 and 61 were doped to their transmissive states (both at +2.5 V) and working electrode 51 was neutralized to its colored state, (at −2.5 V) the device appears red absorbing mainly at 532 nm (FIG. 32 curve a). When electrode 51 and 61 were doped to their transmissive states and electrode 55 was neutralized to its colored state, the device appears green, absorbing mainly at bands of maximal absorption at 434 and 647 nm (FIG. 32 curve b). When working electrodes 51 and 55 were doped to their transmissive states and working electrode 61 was neutralized to its colored state, the device appears blue, absorbing at bands with maximal absorption at 398 and 634 nm (FIG. 32 curve c). The associated color coordinates and the chromaticity diagram of the trichromatic states are shown in FIG. 33. The small triangle represents the color gamut of the RGB 5-electrode electrochromic device and the black triangle represents the color gamut for a cathode ray tube (CRT) device where color is generated from red, green and blue phosphors of adjacent pixels. Although a relatively low purity of the colors was achieved with the experimental device, more pure and saturated colors could be achieved by optimization of the counter electrode, as a blue hue to the overall device results form the reflectance of PEDOT:PSS and Au. In addition, an electrochromic polymer can be of a structure tailored toward more saturated colors. The color purity (saturation) decreases from a single electrochromic film to a dual electrochromic device to an RGB 5-electrode electrochromic device is shown by changes of a* and b* values found in Table 7, below. The changes are not dramatic when progressing from the single layer film to a multi-electrode device. This indicates that an entire range of colors can be generated for use in displays comprising RGB-5 electrode electrochromic devices or such a device employing, alternately, primary subtractive colors.

TABLE 7

Change in a* and b* Values for Component Working Electrodes, a Dual Electrochromic Device and a Multi-Electrode Electrochromic Device

| | a*/b* | | |
|---|---|---|---|
| | Red | Green | Blue |
| Working Electrode | 49/5 | −15/−5 | −21/−36 |
| Dual electrochromic device | 38/6 | −13/−1 | −18/−35 |
| RGB 5-Electrode electrochromic device | 20/1 | −6/−1 | −11/−23 |

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An electrochromic device comprising:
   a first working electrode comprising a first transmissive material and a first electrochromic material;
   a second working electrode comprising a second material and a second electrochromic material, wherein said second material can be the same or different than said first transmissive material;

at least one counter electrode; and electrolyte comprising material dispersed between and contacting said counter electrode and said working electrodes, wherein said counter electrode is transmissive and sandwiched between said working electrodes, wherein said second working electrode is a reflective conducting material or comprises a transparent conductive material whose surface opposite said counter electrode contacts a reflective material and said electrochromic material is disposed on the surface directed toward said counter electrode, wherein electrical potentials are independently applied between said first working electrode and said counter electrode and said second working electrode and said counter electrode, and wherein color observed from said device is derived by combination of colors of said working electrodes.

2. The device of claim 1, wherein said counter electrode is porous or partitioned.

3. The device of claim 2, wherein said counter electrode comprises a substrate coated with an electroactive material that does not change color on at least a portion of at least one side of said porous counter electrode.

4. The device of claim 3, wherein said electroactive material comprises a redox active polymer.

5. The device of claim 4, wherein said redox active polymer comprises a conjugated polymer.

6. The device of claim 1, wherein said first and second electrochromic materials comprise independently a cathodically coloring material, an anodically coloring material, or a material that is of one color in a neutral state and of a different color in an oxidized state.

7. The device of claim 6, wherein said coloring material comprises a cathodically coloring polymer or an anodically coloring polymer.

8. The device of claim 7, wherein said cathodically coloring polymer comprises poly(3,4-alkylenedioxythiophene), alkylene bridge substituted poly(3,4-alkylenedioxythiophene), poly(3,4-alkylenedioxypyrrole), alkylene bridge substituted poly(3,4-alkylenedioxypyrrole), poly(3,4-dialkoxythiophene), poly(3,4-dialkoxypyrrole) or copolymers thereof.

9. The device of claim 7, wherein said anodically coloring polymer comprises N-substituted poly(3,4-alkylenedioxypyrroles), N-substituted alkylene bridge substituted poly(3,4-alkylenedioxypyrroles), N-substituted poly(3,4-dialkoxypyrroles) or copolymers thereof.

10. The device of claim 1, wherein said electrolyte comprising material is a gel electrolyte, solid electrolyte, hydrogel, or ionic liquid.

11. The device of claim 1, wherein said first electrochromic material comprises PProDOP and said second electrochromic material comprises PEDOT.

12. The device of claim 1, wherein said first electrochromic material comprises PProDOP and said second electrochromic material comprises PProDOT-$Hx_2$.

13. The device of claim 1, wherein said first electrochromic material comprises $P(EDOT_2(ProDOT-(CH_2O(2-EtHx))_2)_2BTD)$ and said second electrochromic material comprises PProDOT-$(CH_2COOC_{12}H_{25})_2$.

14. The device of claim 1, further comprising at least one additional working electrode comprising a transmissive material and an additional electrochromic material, wherein electrical potentials are independently applied between said additional working electrode and said counter electrode.

15. The device of claim 14, wherein at least two counter electrodes are used wherein at least one counter electrode is transmissive.

16. The device of claim 14, wherein said first electrochromic material comprises SprayDOT™-Red 252, said second electrochromic material comprises SprayDOT™-Green 179, and said additional electrochromic material comprises SprayDOT™-Blue 153.

17. An electrochromic device comprising:

a first working electrode comprising a first transmissive material and a first electrochromic material;

a second working electrode comprising a second material and a second electrochromic material, wherein said second material can be the same or different than said first transmissive material;

at least one counter electrode; and electrolyte comprising material dispersed between and contacting said counter electrode and said working electrodes, wherein said second working electrode is sandwiched between said first working electrode and said counter electrode and said second working electrode is porous or partitioned, wherein said second working electrode is diffuse reflective or specular reflective, wherein electrical potentials are independently applied between said first working electrode and said counter electrode and said second working electrode and said counter electrode, and wherein color observed from said device is derived by combination of colors of said working electrodes.

18. The device of claim 17, wherein said counter electrode comprises a substrate coated with an electroactive material that does not change color on at least a portion of at least one side of said porous counter electrode.

19. The device of claim 18, wherein said electroactive material comprises a redox active polymer.

20. The device of claim 19, wherein said redox active polymer comprises a conjugated polymer.

21. The device of claim 17, wherein said first and second electrochromic materials comprise independently a cathodically coloring material, an anodically coloring material, or a material that is of one color in a neutral state and of a different color in an oxidized state.

22. The device of claim 21, wherein said coloring material comprises a cathodically coloring polymer or an anodically coloring polymer.

23. The device of claim 21, wherein said cathodically coloring polymer comprises poly(3,4-alkylenedioxythiophene), alkylene bridge substituted poly(3,4-alkylenedioxythiophene), poly(3,4-alkylenedioxypyrrole), alkylene bridge substituted poly(3,4-alkylenedioxypyrrole), poly(3,4-dialkoxythiophene), poly(3,4-dialkoxypyrrole) or copolymers thereof.

24. The device of claim 21, wherein said anodically coloring polymer comprises N-substituted poly(3,4-alkylenedioxypyrroles), N-substituted alkylene bridge substituted poly(3,4-alkylenedioxypyrroles), N-substituted poly(3,4-dialkoxypyrroles) or copolymers thereof.

25. The device of claim 17, wherein said electrolyte comprising material is a gel electrolyte, solid electrolyte, hydrogel, or ionic liquid.

26. The device of claim 17, wherein said first electrochromic material comprises PProDOP and said second electrochromic material comprises PEDOT.

27. The device of claim 17, wherein said first electrochromic material comprises PProDOP and said second electrochromic material comprises PProDOT-$Hx_2$.

28. The device of claim 17, wherein said first electrochromic material comprises $P(EDOT_2(ProDOT-(CH_2O(2-EtHx))_2)_2BTD)$ and said second electrochromic material comprises PProDOT-$(CH_2COOC_{12}H_{25})_2$.

29. The device of claim 17, further comprising at least one additional working electrode comprising a transmissive material and an additional electrochromic material, wherein electrical potentials are independently applied between said additional working electrode and said counter electrode.

30. The device of claim 29, wherein at least two counter electrodes are used wherein at least one counter electrode is transmissive.

31. The device of claim 29, wherein said first electrochromic material comprises SprayDOT™-Red 252, said second electrochromic material comprises SprayDOT™-Green 179, and said additional electrochromic material comprises SprayDOT™-Blue 153.

32. An electrochromic device comprising:
a first working electrode comprising a first transmissive material and a first electrochromic material;
a second working electrode comprising a second material and a second electrochromic material, wherein said second material can be the same or different than said first transmissive material;
at least one counter electrode; and
electrolyte comprising material dispersed between and contacting said counter electrode and said working electrodes, wherein electrical potentials are independently applied between said first working electrode and said counter electrode and said second working electrode and said counter electrode, wherein said first and second electrochromic materials comprise independently a cathodically coloring material, an anodically coloring material, or a material that is of one color in a neutral state and of a different color in an oxidized state, and wherein color observed from said device is derived by combination of colors of said working electrodes.

33. The device of claim 32, wherein said counter electrode is transmissive and sandwiched between said working electrodes.

34. The device of claim 33, wherein said counter electrode is porous or partitioned.

35. The device of claim 34, wherein said counter electrode comprises a substrate coated with an electroactive material that does not change color on at least a portion of at least one side of said porous counter electrode.

36. The device of claim 35, wherein said electroactive material comprises a redox active polymer.

37. The device of claim 36, wherein said redox active polymer comprises a conjugated polymer.

38. The device of claim 33, wherein said second working electrode is a reflective conducting material or comprises a transparent conductive material whose surface opposite said counter electrode contacts a reflective material and said electrochromic material is disposed on the surface directed toward said counter electrode.

39. The device of claim 32, wherein said second working electrode is sandwiched between said first working electrode and said counter electrode and said second working electrode is porous or partitioned.

40. The device of claim 39, wherein said second working electrode is diffuse reflective or specular reflective.

41. The device of claim 32, wherein said coloring material comprise a cathodically coloring polymer or an anodically coloring polymer.

42. The device of claim 41, wherein said cathodically coloring polymer comprises poly(3,4-alkylenedioxythiophene), alkylene bridge substituted poly(3,4-alkylenedioxythiophene), poly(3,4-alkylenedioxypyrrole), alkylene bridge substituted poly(3,4-alkylenedioxypyrrole), poly(3,4-dialkoxythiophene), poly(3,4-dialkoxypyrrole) or copolymers thereof.

43. The device of claim 41, wherein said anodically coloring polymer comprises N-substituted poly(3,4-alkylenedioxypyrroles), N-substituted alkylene bridge substituted poly(3,4-alkylenedioxypyrroles), N-substituted poly(3,4-dialkoxypyrroles) or copolymers thereof.

44. The device of claim 32, wherein said electrolyte comprising material is a gel electrolyte, solid electrolyte, hydrogel, or ionic liquid.

45. The device of claim 32, wherein said first electrochromic material comprises PProDOP and said second electrochromic material comprises PEDOT.

46. The device of claim 32, wherein said first electrochromic material comprises PProDOP and said second electrochromic material comprises PProDOT-Hx$_2$.

47. The device of claim 32, wherein said first electrochromic material comprises P(EDOT$_2$(ProDOT-(CH$_2$O(2-EtHx))$_2$)$_2$BTD) and said second electrochromic material comprises PProDOT-(CH$_2$COOC$_{12}$H$_{25}$)$_2$.

48. The device of claim 32, further comprising at least one additional working electrode comprising a transmissive material and an additional electrochromic material, wherein electrical potentials are independently applied between said additional working electrode and said counter electrode.

49. The device of claim 48, wherein at least two counter electrodes are used wherein at least one counter electrode is transmissive.

50. The device of claim 48, wherein said first electrochromic material comprises SprayDOT™-Red 252, said second electrochromic material comprises SprayDOT™-Green 179, and said additional electrochromic material comprises SprayDOT™-Blue 153.

* * * * *

UNITED STATES PATENT AND TRADEMARK OFFICE
CERTIFICATE OF CORRECTION

PATENT NO. : 8,284,473 B2
APPLICATION NO. : 12/746541
DATED : October 9, 2012
INVENTOR(S) : John R. Reynolds, Aubrey Lynn Dyer and Ece Unur Page 1 of 3

It is certified that error appears in the above-identified patent and that said Letters Patent is hereby corrected as shown below:

Column 4,
Line 10, "PropOP" should read --ProDOP--.
Line 12, "PPropOP" should read --ProDOP--.
Line 17, "PPropOP" should read --PProDOP--.
Line 20, "PPropOT-Hx$_2$" should read --PProDOT-Hx$_2$--.
Line 32, "PPropOP" should read --PProDOP--.
Line 36, "PPropOT-Hx$_2$" should read --PProDOT-Hx$_2$--.
Line 45, "PPropOP (-1.7 to +0.1 V vs. Fc/Fc" should read --PProDOP (-1.7 to +0.1 V vs. Fc/Fc$^+$--.
Line 49, "PPropOT-Hx$_2$" should read --PProDOT-Hx$_2$--.
Line 50, "V vs. Fc/Fc'" should read --V vs. Fc/Fc$^+$--.
Line 56, "PPropOP" should read --PProDOP--.
Line 59, "PPropOT-Hx$_2$" should read --PProDOT-Hx$_2$--.
Lines 61-62, "PPro-pOP/PEDOT" should read --PProDOP/PEDOT--.
Lines 66-67, "PPro-pOP/PEDOT" should read --PProDOP/PEDOT--.

Column 7,
Line 67, "such titanium" should read --such as titanium--.

Column 10,
Line 42, "(PPropOP)" should read --(PProDOP)--.
Line 56, "PPropOP" should read --PProDOP--.
Line 57, "(PPropOT-Hx$_2$)" should read --(PProDOT-Hx$_2$)--.
Line 64, "PPropOP" should read --PProDOP--.
Line 66, "PPropOT-Hx$_2$" should read --PProDOT-Hx$_2$--.

Column 11,
Line 52, "A* = 2" should read --a* = 2--.

Signed and Sealed this
Twenty-second Day of January, 2013

David J. Kappos
*Director of the United States Patent and Trademark Office*

CERTIFICATE OF CORRECTION (continued)
U.S. Pat. No. 8,284,473 B2

Column 12,
Line 23, "the art can be" should read --the art and can be--.

Column 13,
Line 27, "(PPropOT" should read --(PProDOT--.
Line 29, "(PropOT" should read --(ProDOT--.
Line 31, "(PropOT" should read --(ProDOT--.

Column 14,
Line 30, "a* = -4 77" should read --a* = -4--.

Column 15,
Line 36, "PropOP" should read --ProDOP--.
Line 44, "PropOP" should read --ProDOP--.
Line 46, "PPropOT-Hx$_2$" should read --PProDOT-Hx$_2$--.
Line 58, "PPropOP" should read --PProDOP--.
Line 59, "PPropOT-Hx$_2$" should read --PProDOT-Hx$_2$--.

Column 16,
Line 6, "PPropOP" should read --PProDOP--.
Line 8, "PPropOT-Hx$_2$" should read --PProDOT-Hx$_2$--.
Line 9, "at 2" should read --at $\lambda_{max}$--.
Line 14, "PPropOP" should read --PProDOP--.
Line 15, "PPropOT-Hx$_2$" should read --PProDOT-Hx$_2$--.
Line 20, "PPropOP" should read --PProDOP--.
Line 28, "PPropOP" should read --PProDOP--.
Line 29, "PPropOT-Hx$_2$" should read --PProDOT-Hx$_2$--.
Line 42, "PPropOP" should read --PProDOP--.
Line 44, "PPropOT-Hx$_2$" should read --PProDOT-Hx$_2$--.
Line 61, "PPropOP" should read --PProDOP--.
Line 63, "PPropOT-Hx$_2$" should read --PProDOT-Hx$_2$--.

Column 17,
Line 3, "PPropOP" should read --PProDOP--.
Line 5, "PPropOT-Hx$_2$" should read --PProDOT-Hx$_2$--.
Line 9, "PPropOT-Hx$_2$" should read --PProDOT-Hx$_2$--.
Line 11, "PPropOP" should read --PProDOP--.
Line 13, "PPropOT-Hx$_2$" should read --PProDOT-Hx$_2$--.
Lines 16-17, "PPropOTs" should read --PProDOTs--.
Line 19, "PPropOP" should read --PProDOP--.
Line 29, "PPropOP/PEDOT and PPropOP/PPropOT-Hx$_2$" should read --PProDOP/PEDOT and PProDOP/PProDOT-Hx$_2$--.
Line 43, "PPropOP" should read --PProDOP--.
Line 45, "PPropOP" should read --PProDOP--.
Line 65, "PPropOP" should read --PProDOP--.

Column 18,
Line 4, "PPropOP" should read --PProDOP--.
Lines 8-9, "PPropOP/PPropOT-Hx$_2$" should read --PProDOP/PProDOT-Hx$_2$--.
Line 9, "PPropOP" should read --PProDOP--.
Lines 10-11, "PPropOT-Hx$_2$" should read --PProDOT-Hx$_2$--.
Line 12, "PPropOT-Hx$_2$" should read --PProDOT-Hx$_2$--.
Line 14, "PPropOP" should read --PProDOP--.
Line 15, "PPropOT-Hx$_2$" should read --PProDOT-Hx$_2$--.
Line 16, "PPropOP" should read --PProDOP--.
Line 22, "PPropOP" should read --PProDOP--.
Lines 28-29, "PPropOP-N-EtCN" should read --PProDOP-N-EtCN--.
Line 40, "(PPropOP-N-EtCN)" should read --(PProDOP-N-EtCN)--.
Line 42, "PPropOP-N-EtCN" should read --PProDOP-N-EtCN--.
Line 43, "PPropOP-N-EtCN" should read --PProDOP-N-EtCN--.

Column 19,
Line 3, "PPropOP derivatives (PPropOP-N-EtCN)" should read --PProDOP derivatives (PProDOP-N-EtCN)--.
Line 8, "PPropOT" should read --PProDOT--.

Column 20,
Lines 45-46, "Green 45/PPropOP-N-EtCN" should read --Green 145/PProDOP-N-EtCN--.
Line 48, "PPropOP-N-EtCN" should read --PProDOP-N-EtCN--.
Line 49, "PPropOP-N-EtCN" should read --PProDOP-N-EtCN--.
Line 52, "PPropOP-N-EtCN" should read --PProDOP-N-EtCN--.
Lines 57-58, "PPropOP-N-EtCN" should read --PProDOP-N-EtCN--.
Line 63, "PPropOP-N-EtCN" should read --PProDOP-N-EtCN--.
Line 67, "PPropOP-N-EtCN" should read --PProDOP-N-EtCN--.

Column 21,
Lines 56-57, "PPropOP-N-EtCN" should read --PProDOP-N-EtCN--.

Column 24,
Lines 45-46, "Green 179 (10.95" should read --Green 179 (t0.95--.

Column 25,
Line 47, "has L*, b* coordinates" should read --has L*, a*, b* coordinates--.